United States Patent [19]
Brough

[11] Patent Number: 5,937,562
[45] Date of Patent: Aug. 17, 1999

[54] OPTICAL ACCESSORY

[75] Inventor: Richard Brough, Chantilly, Va.

[73] Assignee: Henry Technical Services, Incorporated, Chantilly, Va.

[21] Appl. No.: 08/971,728

[22] Filed: Nov. 17, 1997

[51] Int. Cl.⁶ ................................................ F41G 1/38
[52] U.S. Cl. ........................... 42/103; 33/241; 89/41.19; 250/206
[58] Field of Search ............................. 42/100, 101, 103; 89/41.19; 33/241, 233; 250/206

[56] References Cited

U.S. PATENT DOCUMENTS

| | | | |
|---|---|---|---|
| 2,529,057 | 11/1950 | Teffault | 33/47 |
| 2,599,689 | 6/1952 | Brelsford | 42/1 |
| 2,946,255 | 7/1960 | Bolay | 88/1 |
| 2,951,292 | 9/1960 | Buehler | 33/50 |
| 3,464,757 | 9/1969 | Schmidt | 350/1 |
| 3,529,882 | 9/1970 | Schmidt | 350/2 |
| 4,161,835 | 7/1979 | Lough | 42/1 A |
| 4,524,675 | 6/1985 | Durenec et al. | 89/41.03 |
| 4,822,994 | 4/1989 | Johnson et al. | 250/213 VT |
| 4,899,460 | 2/1990 | Huggins | 33/245 |
| 4,961,278 | 10/1990 | Johnson et al. | 42/101 |
| 5,040,885 | 8/1991 | Simms | 350/537 |
| 5,130,527 | 7/1992 | Gramer et al. | 250/213 VT |
| 5,140,151 | 8/1992 | Weiner et al. | 250/213 |
| 5,157,548 | 10/1992 | Monnier et al. | 359/630 |
| 5,272,514 | 12/1993 | Dor | 356/251 |
| 5,299,067 | 3/1994 | Kutz et al. | 359/827 |
| 5,434,704 | 7/1995 | Connors et al. | 359/403 |
| 5,444,507 | 8/1995 | Palmer | 354/82 |
| 5,528,418 | 6/1996 | Bowman, Jr. | 359/400 |

OTHER PUBLICATIONS

Advertisement for ITT Night Vision F7201 Day/Night Weaponsight System.

3 Photographs of Henry Technical Services Nightmate product.

*Primary Examiner*—Charles T. Jordan
*Assistant Examiner*—Denise J Buckley
*Attorney, Agent, or Firm*—Morgan, Lewis & Bockius LLP

[57] ABSTRACT

An apparatus for converting an optical device for night use, the apparatus including a housing, a clamping mechanism coupled to the housing and adapted to clampingly engage an end of the optical device, and a image intensifying instrument disposed in the housing and arranged so that when the housing is coupled to the optical device by the clamping mechanism, light is transmitted through the optical device into the image intensifying instrument.

18 Claims, 28 Drawing Sheets

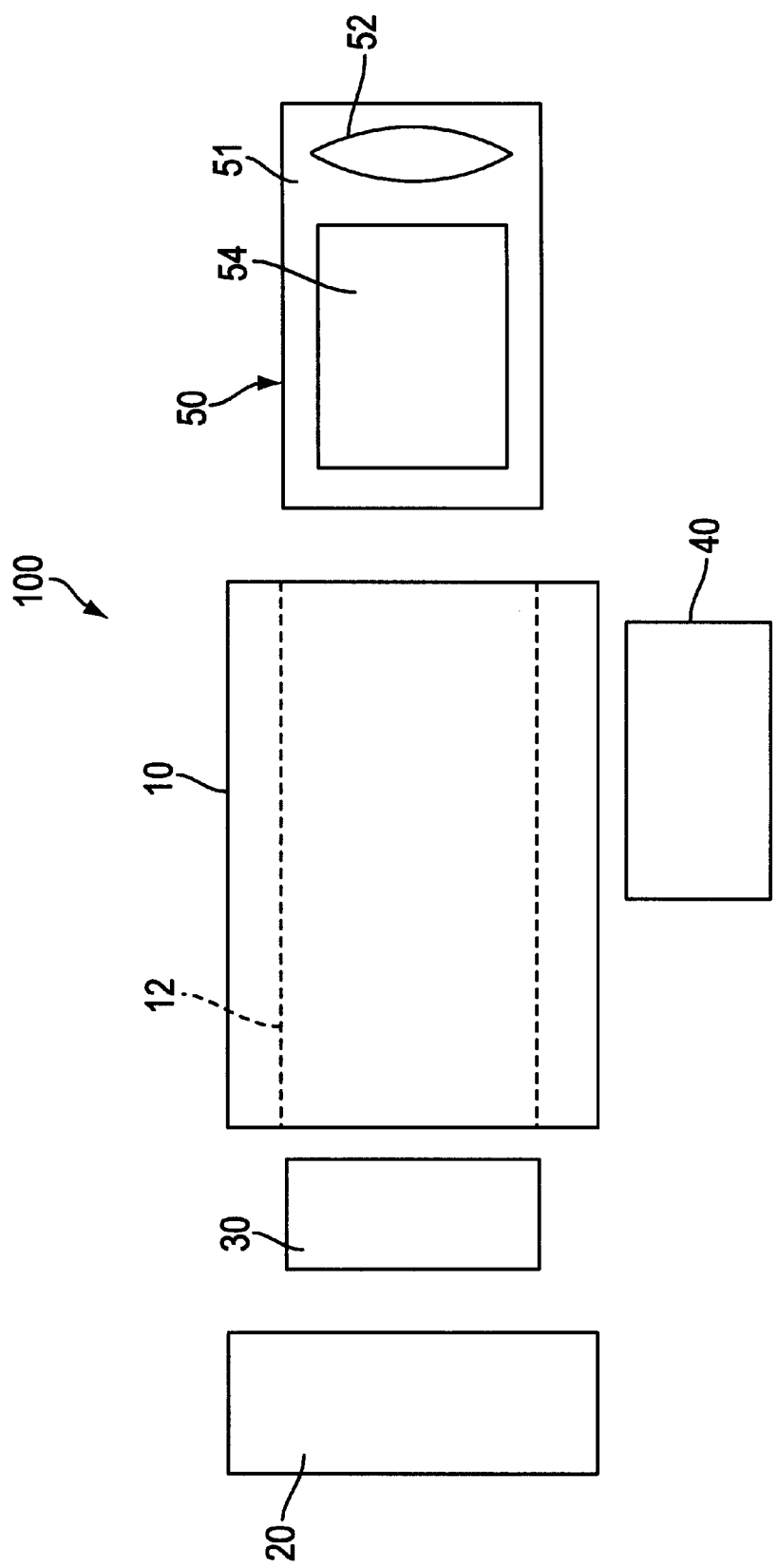

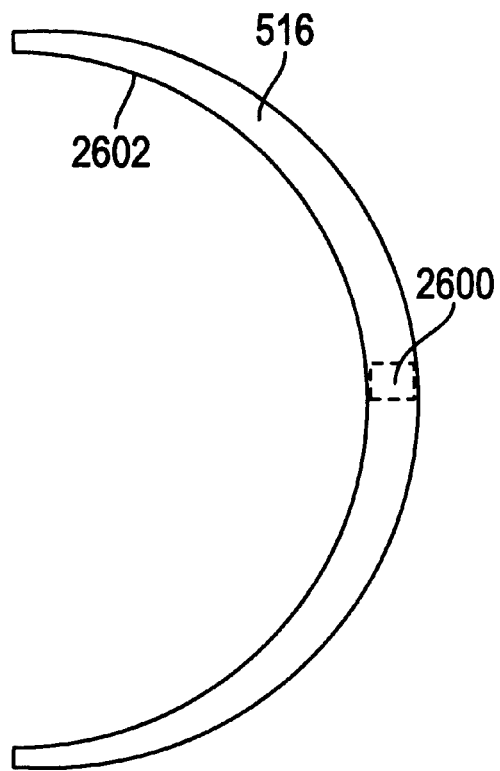 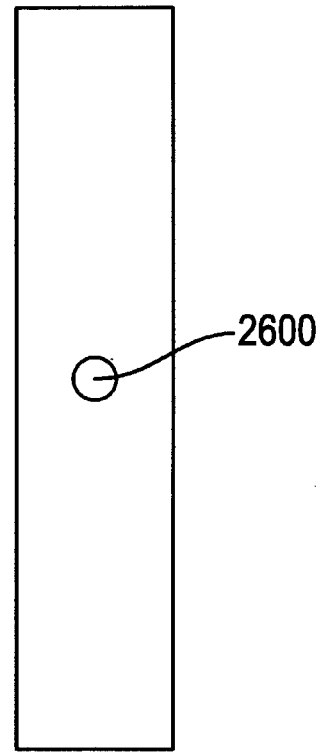
FIG. 26A     FIG. 26B
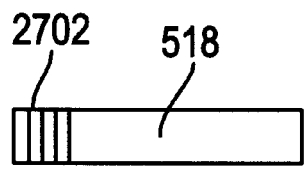
FIG. 27

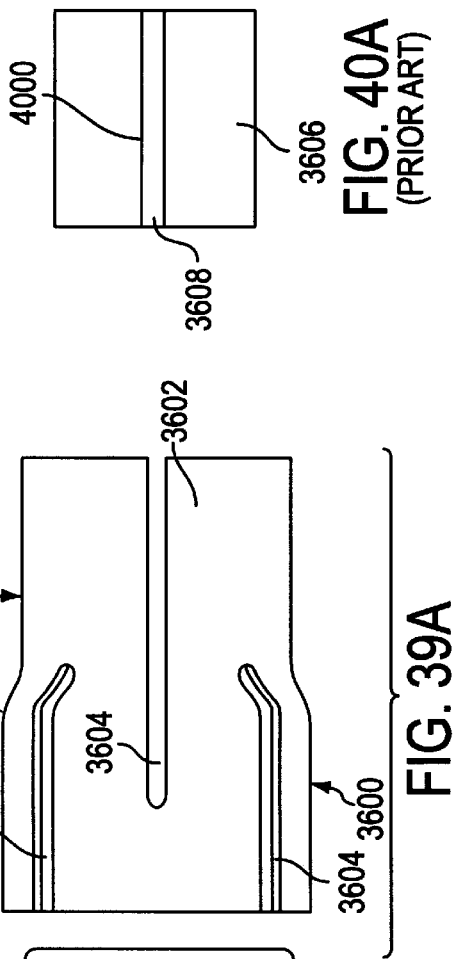
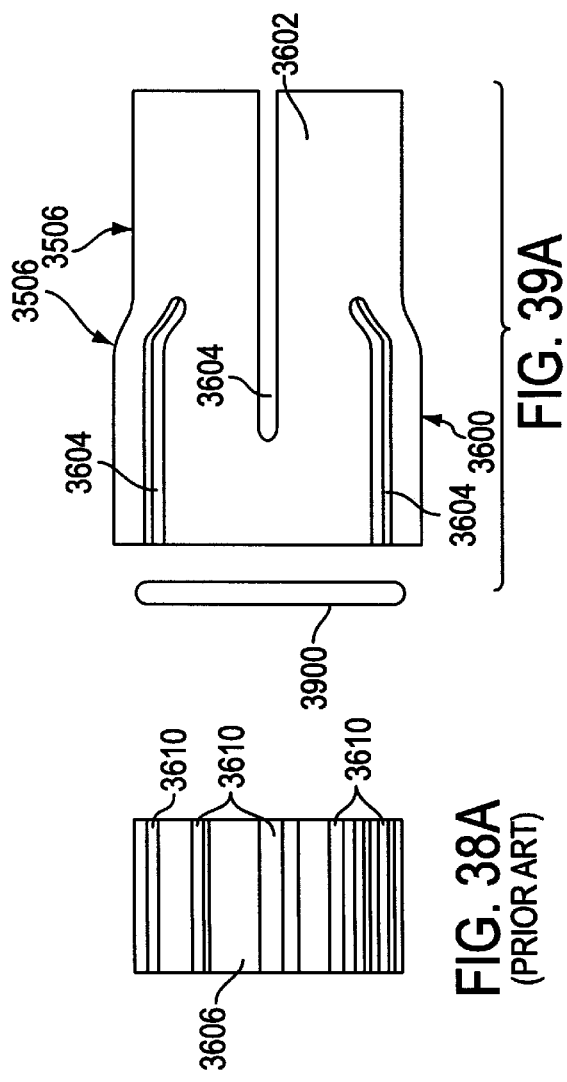
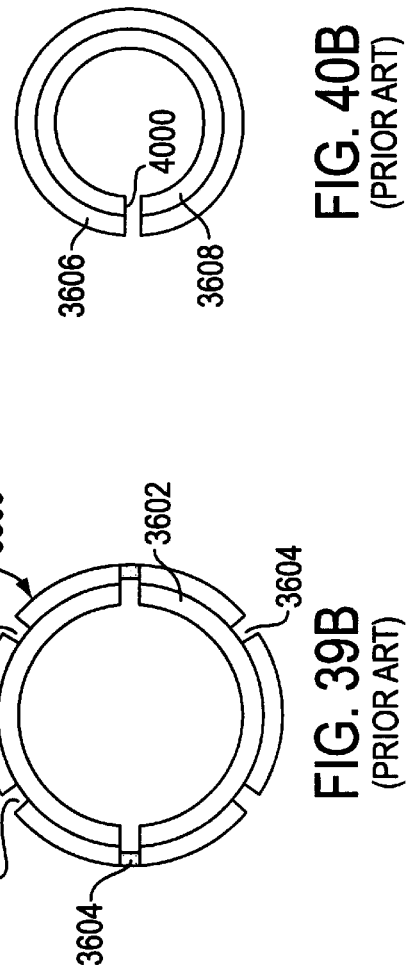
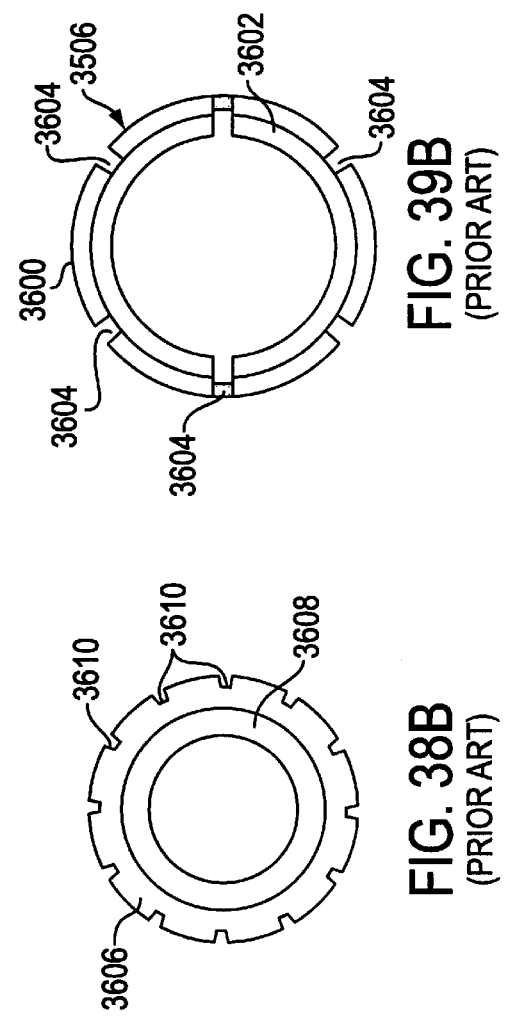

OPTICAL ACCESSORY

BACKGROUND OF THE INVENTION

1. Field of the Invention

The present invention relates to optical accessories, and more particularly, to an optical accessory for coupling to the output end of a optical scope to extend its capabilities.

2. Discussion of the Related Art

In the field of optics, there are numerous types of optical devices available. Additional equipment is required to permit the optical devices to be used in a low level light environment. An example of such equipment is a light or image intensifier.

The prior art includes many attempts to combine optical devices and image intensifying equipment, all suffering from significant disadvantages. One example is U.S. Pat. No. 4,822,994, ("Johnson"). Johnson discloses a small arms sight assembly which enables a firearm such as a revolver or rifle to be employed for both daytime and nighttime use. During daytime use, a first section of the scope, with an objective lens, is coupled to a second section, with an eyepiece, by a flange. However, for night use, the two sections are separated, an image intensifier is inserted between them, and the three parts are connected together by flanges. The procedure to convert the firearm from daytime use to nighttime use is complex and time consuming. Further, the three components are compatible for use only with each other.

Another example is U.S. Pat. No. 5,444,507, ("Palmer"). Palmer discloses a device for coupling a night vision device to a video camera recorder. The night vision device, a video camera recorder, and a stabilizing bracket are firmly secured to a mounting plate via screws. Attaching the night vision device to the camera recorder is time consuming and cumbersome since several parts need to be attached to the mounting plate.

Another example is a weaponsight sold by ITT as the F7200/F7201 ITT Modular Day/Night Weaponsight. This weaponsight system requires a user to interchange a day eyepiece assembly with a night eyepiece assembly in order to use the weaponsight at night. The night eyepiece assembly includes an image intensifier. The conversion of the weapon to nighttime use is time consuming because the day eyepiece must be removed before the night eyepiece is mounted. The same problem is true when the weapon is converted to daytime use. Furthermore, the night eyepiece cannot be used for any other purpose (e.g., it cannot be used as a night vision monocular).

Another problem in the prior art is that some mounting arrangements of the night use equipment requires the separation of the optic parts of an optical device. Since the optic parts are typically maintained in a controlled atmosphere within a housing, each separation affects the reliability and operation of the optic parts.

Another problem in the prior art is the inability to easily and quickly retrofit the night use equipment to an existing optical device if the known devices are custom configured for interoperability. Further, the night use equipment is for a single purpose, providing only for night vision and not for other functions such as thermal imaging or video imaging.

Therefore, there is a need in the art for a device that is easily and quickly mounted to an existing optical device to convert it for night use or otherwise extend its capabilities. Also, there is a need for an apparatus that converts an optical device for night use without significantly altering the device.

Finally, there is a need for equipment that provides ready change between functions such as night vision, thermal imaging, and video imaging.

SUMMARY OF THE INVENTION

The shortcomings of the prior art are addressed by the disclosed optical accessory, which includes a housing with a coupler by which the optical accessory can be readily attached to the output end of a optical scope, such as a rifle scope, telescope, or an spotting scope. The housing also supports or encloses a power source (battery) to power an accessory device, an objective lens that receives optical output from the optical scope, and a cavity for receiving the accessory device. Any one of several accessory devices can be placed in the housing cavity.

In the preferred embodiments, the accessory device is an image intensifier unit that includes an objective lens, an image intensifier, and an eyepiece lens. The optical output of the optical scope can thus be transmitted through the objective lens and into the input end of the image intensifier. The intensifier presents a light amplified image on an output screen which can be viewed by the user through the eyepiece.

The optical accessory thus adapts the optical scope to function as a night vision scope. The optical accessory can be easily removed from the optical scope and is independently functional as a image intensifying monocular.

Alternatively, other accessory devices can be inserted in the housing cavity to modify the optical output of the optical scope in other ways. For example, a thermal imaging device may be used to permit a user to acquire a thermal image of a viewed object or scene. Similarly, a video imaging device can be used to permit the optical scope to function as a video output device.

The optical accessory can be configured with the coupler fixed to the housing or as a separate component.

BRIEF DESCRIPTION OF THE DRAWINGS

FIG. 1 is a schematic diagram of an optical accessory embodying the principles of the preferred embodiment of the invention;

FIGS. 26A–B are side and top views of the lens focus mount;

FIG. 27 is a side view of the lens focus handle;

FIGS. 38A–B are side and end views of the prior art coupler's bushing;

FIGS. 39A–B are side and end views of the prior art coupler's body; and

FIGS. 40A–B are side and end views of another embodiment of the prior art coupler's bushing.

DETAILED DESCRIPTION OF THE PREFERRED EMBODIMENTS

Figure 2A:
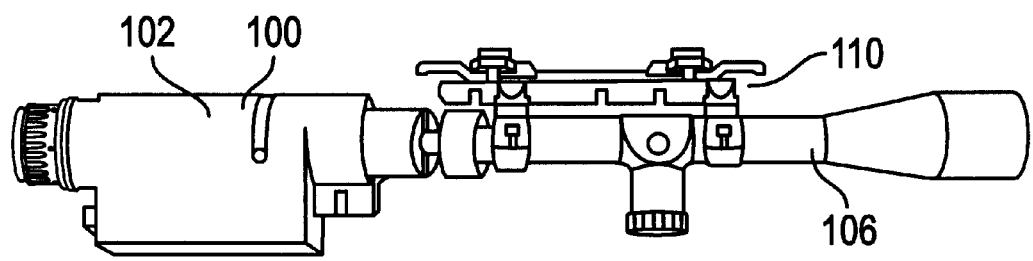
FIGS. 2A–2C are left side, right side, and perspective views of a physical embodiment of the optical accessory of FIG. 1, coupled to a rifle scope.

A schematic illustration of an optical accessory embodying the principles of the invention is shown in FIG. 1. Optical accessory 100 includes a body or housing 10. A coupler 20 is disposed at the front end of the housing 10, by which the optical accessory 100 can be coupled to an optical device, such as an end of a optical scope (for example—a rifle scope, a telescope, or a spotting scope).

Objective optics 30 are mounted in the cavity 12 of the housing 10. A power supply 40 is mounted to the housing 10. The housing 10 includes a receptacle or cavity 12 into which a modular accessory device 50 can be inserted. In the illustrated embodiment, accessory device 50 is an image intensifying modular accessory device, which includes a cartridge body 51, an image intensifying tube 54 mounted in the cartridge body 51, and an eyepiece 52 mounted in the cartridge body 51.

Figure 2B:
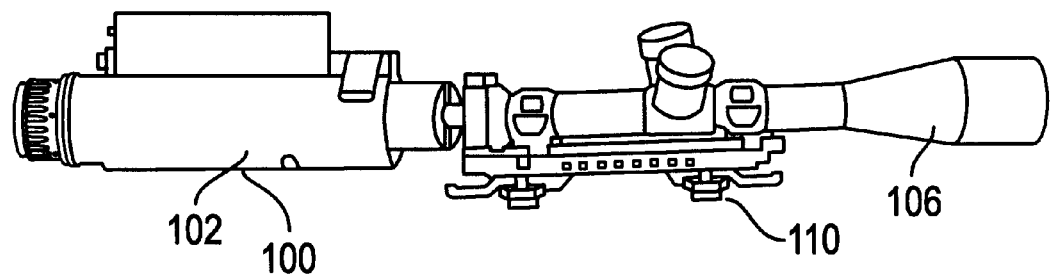
Figure 2C:
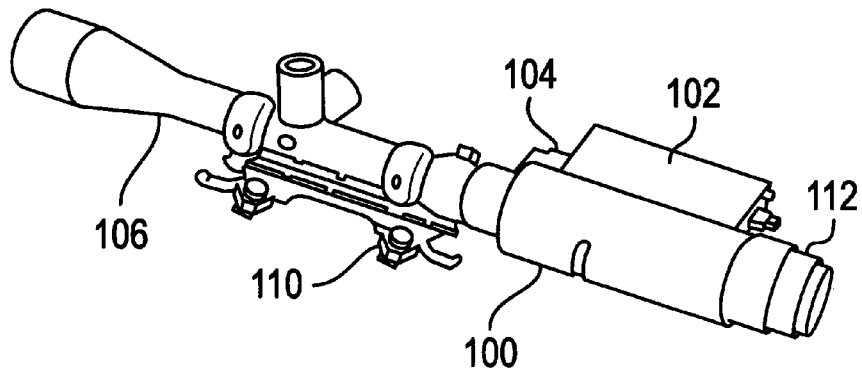
Figure 3:
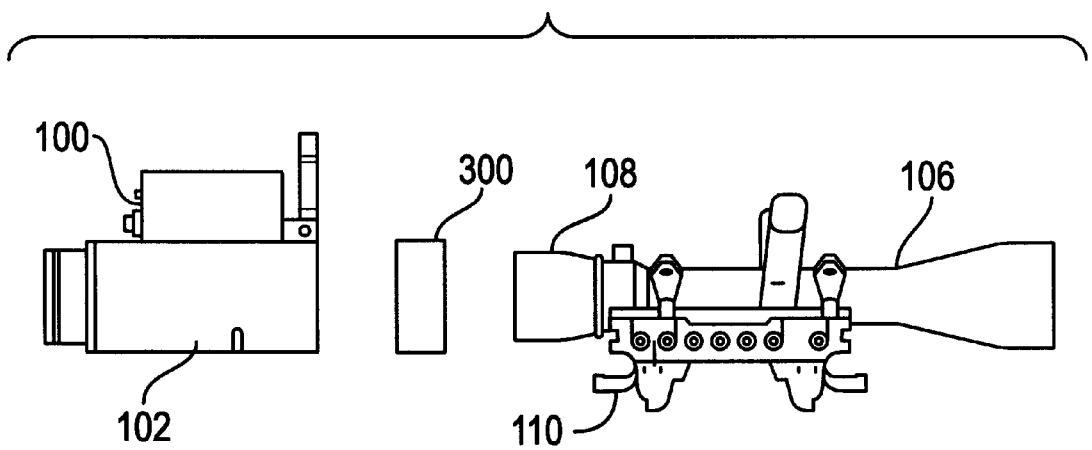
FIG. 3 is an exploded perspective view of the optical accessory and rifle scope shown in FIGS. 2A–2C.

A first physical implementation of the optical accessory shown schematically in FIG. 1 is shown in FIGS. 2A–34. Optical accessory 100 is shown in FIGS. 2A–2C coupled to a rifle scope 106.

The rifle scope 106 shown is intended only to be exemplary of the many types of optical devices on which the optical accessory may be mounted. Other suitable optical devices include other optical scopes, such as spotting scopes or telescopes.

Figure 4:
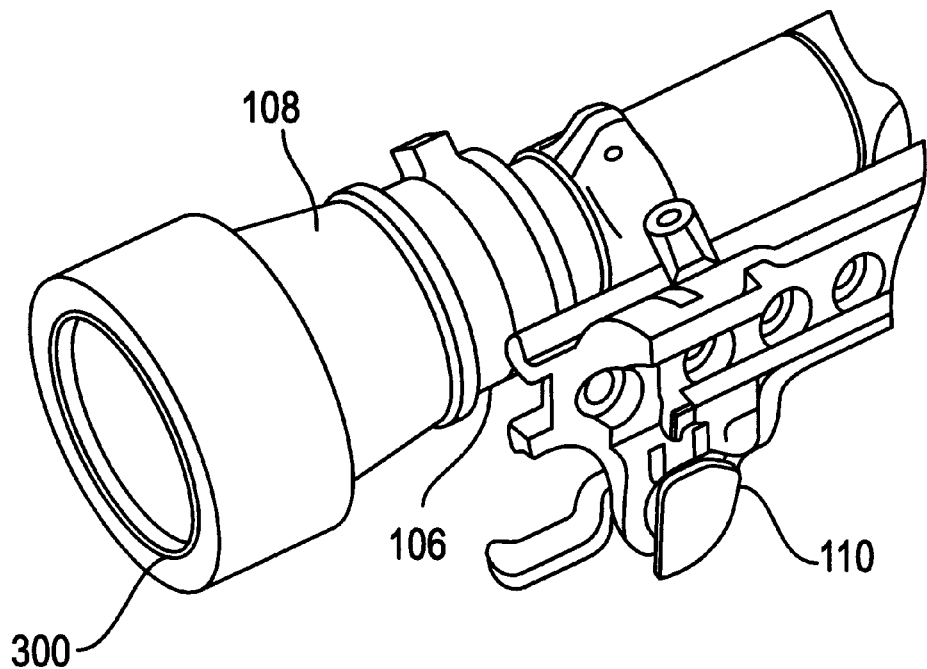
FIG. 4 is a view of the coupler sleeve on the end of the rifle scope.

As shown in FIGS. 2C–4, the rifle scope 106 includes an output end 108 to which the optical accessory 100 can be coupled and mounting means 110 on the bottom surface of the rifle scope 106. The mounting means 110 permits the rifle scope 106 to be coupled to the rifle. Referring to FIGS. 2A and 2B, the arrangement of the optical accessory 100 and the rifle scope 106 is shown from opposite sides. FIG. 4 also shows coupler sleeve 300 mounted to output end 108.

Figure 5A:
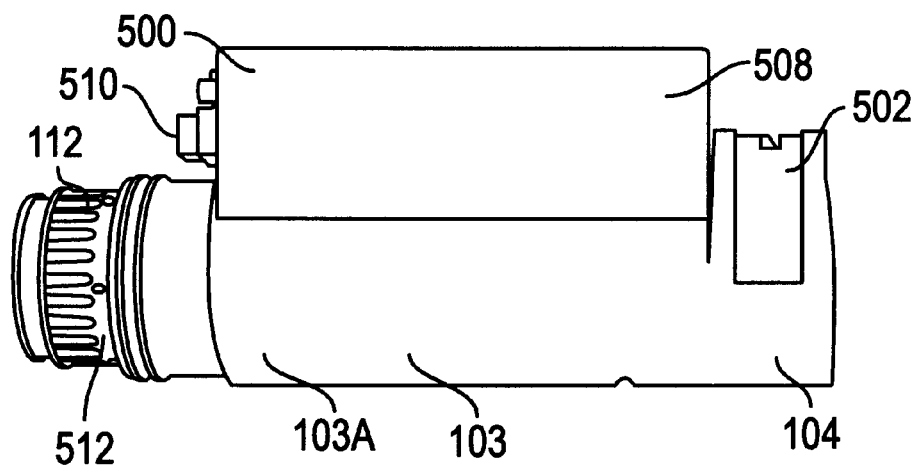
FIGS. 5A–B are left and right side views of the optical accessory of FIG. 3.
Figure 5B:
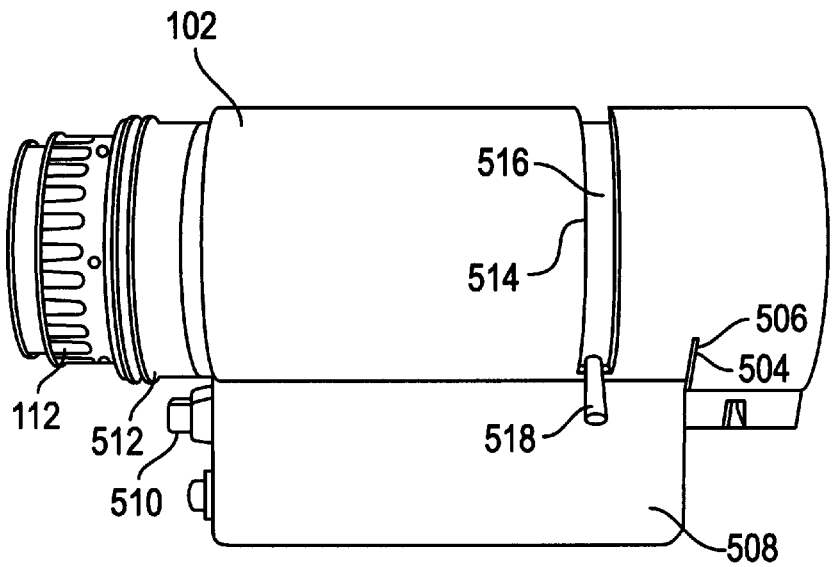
Figure 6:
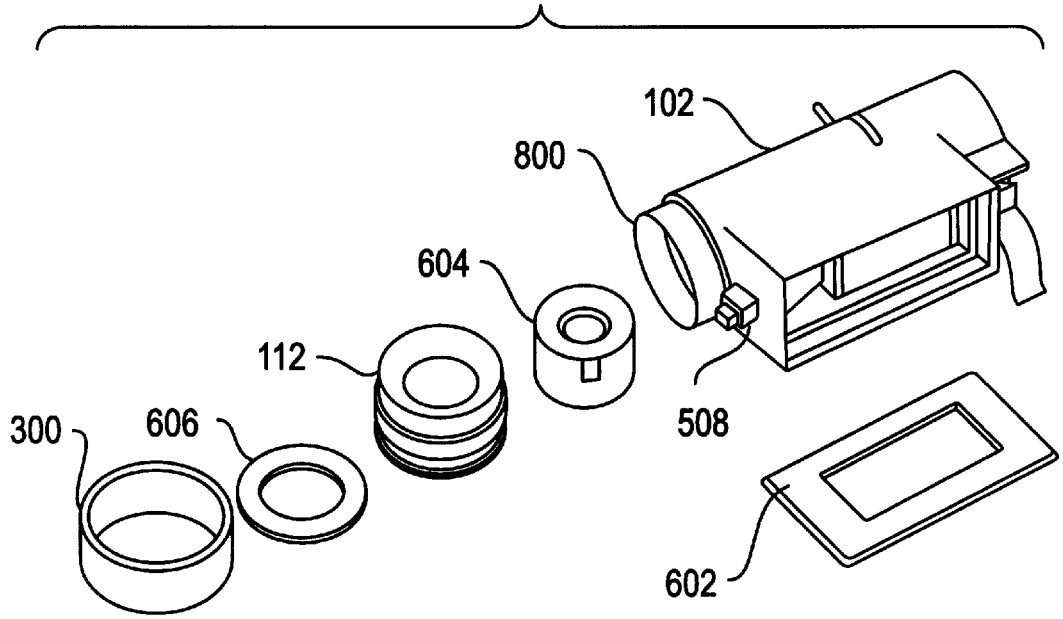
FIG. 6 is an exploded perspective view of the optical accessory and related parts.
Figure 7:
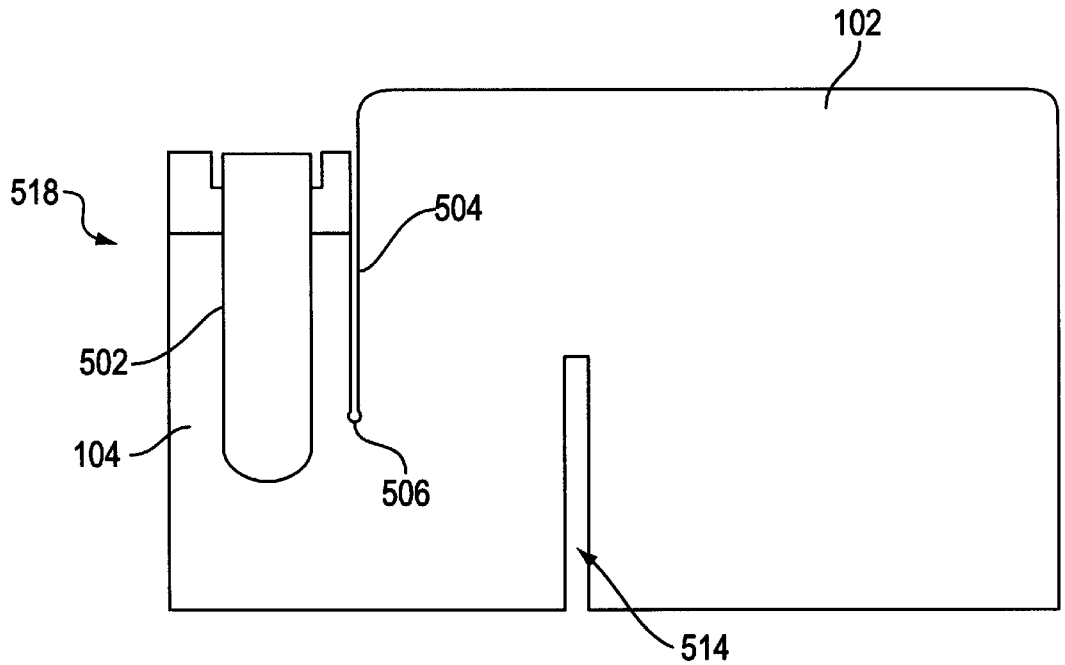
FIGS. 7–8 are side and end views of the housing.

As shown in FIGS. 5A, 5B, and 6, optical accessory 100 includes a housing 102, a coupler 104, a power supply 500, a bore 800, and a modular accessory device 512.

Housing 102 includes a generally cylindrical body 103 with a battery compartment body 508 projecting from its top side. Housing 102 has a stepped cylindrical bore 800. Bore 800 has a front portion 801 with a front opening 801A, and a rear portion 802 with a rear opening 802A. These portions are demarcated by a shoulder 900 (see FIG. 9).

Figure 9:
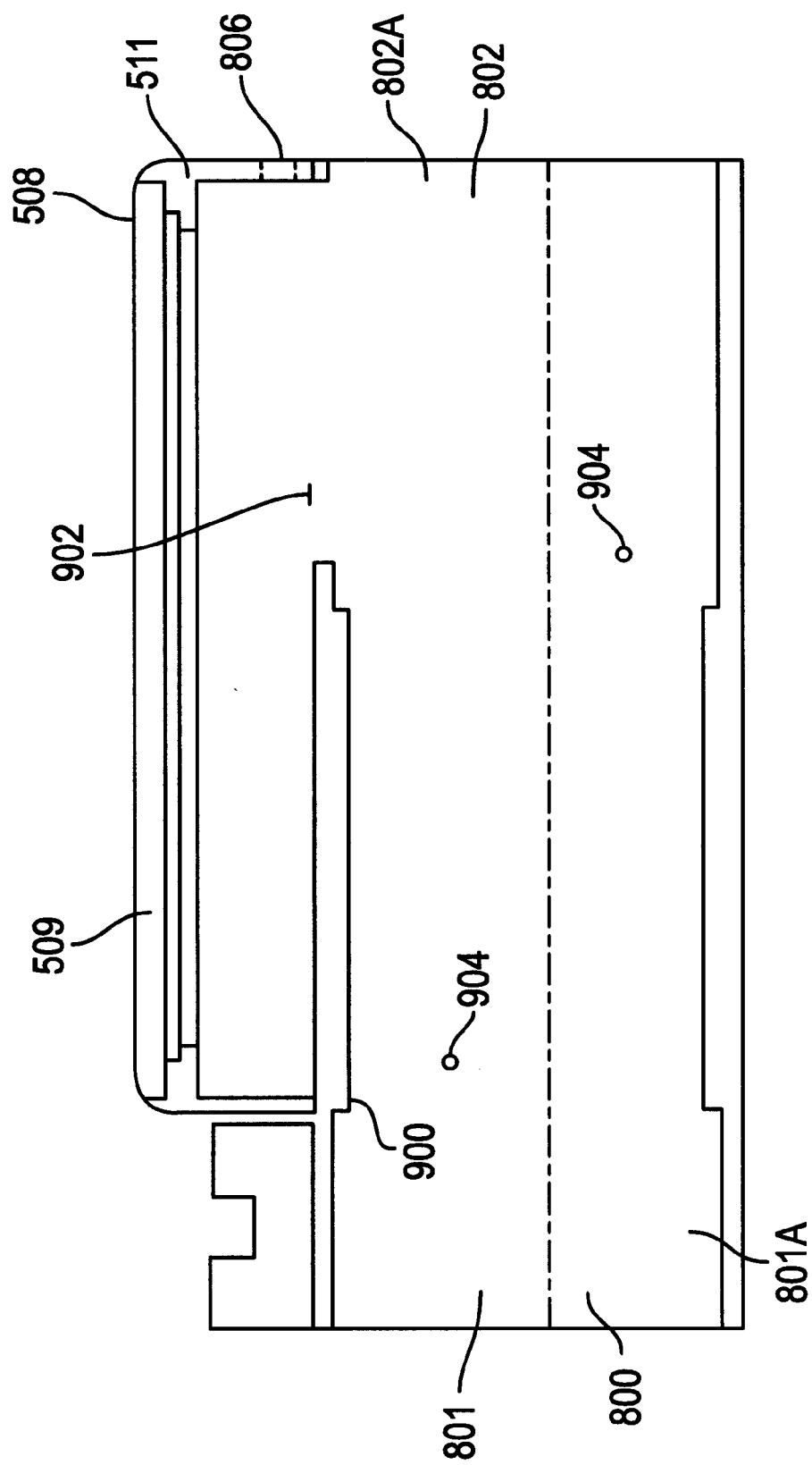
FIG. 9 is a cross-sectional view of the housing shown in FIG. 8.
Figure 10:
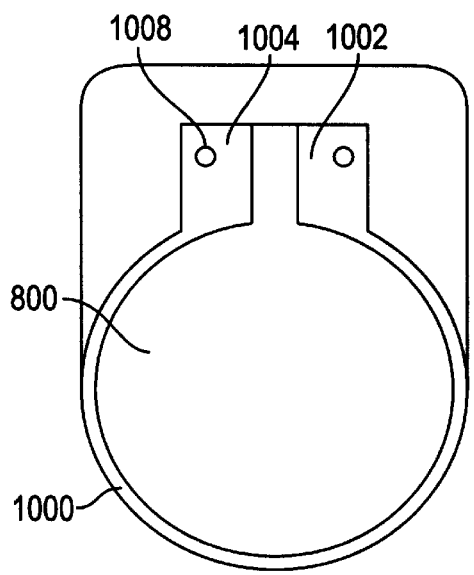
FIGS. 10–13 are side and end views of the coupler of the housing.
Figure 11:
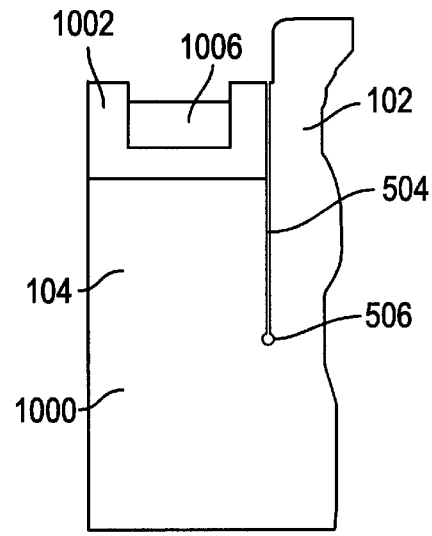
Figure 12:
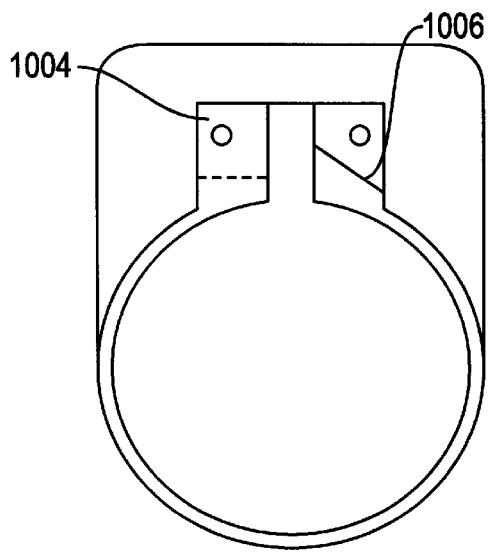
Figure 13:
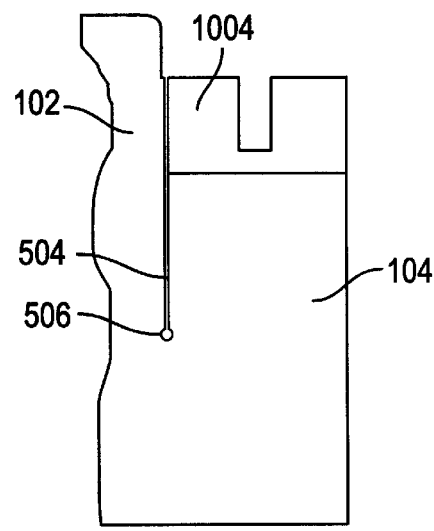

As shown in FIG. 9, bore 800 communicates with the interior cavity 600 of the battery compartment 508 by opening 902. As shown in Figs. SB and 7, an elongated focus handle slot 514 penetrates the side wall 103A of body 103. Battery compartment 508 includes an upper opening 509 which can be closed with a battery compartment lid 602, and a power switch hole 806 in its rear side wall 511 (see FIG. 9). Further, there are several holes 904 for set screws (not shown) to fasten part of the modular accessory device 512 to the housing 102. Preferably, four holes 904 are spaced at appropriate intervals around the interior of the bore 800 (although only two of these holes are visible in the cross-sectional view shown in FIG. 9). In the illustrated embodiment, the housing is formed of aluminum, although any suitable material may be used.

In the illustrated embodiment, coupler 104 is formed integrally with the front end of the housing 102. FIGS. 10–17, and 19 are relevant to the coupler 104. Coupler 104 is formed as a split ring 1000 formed by partially cutting through the front end of the housing 102. The partial cut results in slit 504 that has a stress relief hole 506 at an end of the slit 504. The slit 504 allows a relatively small range of movement between the coupler 104 and the remainder of the housing 102.

As shown in FIGS. 10–14, the split ring 1000 includes two pairs of shoulders adjacent the ends of the split ring 1000 (narrow shoulders 1002 and wide shoulders 1004). Each of the shoulders 1002 and 1004 contain a through hole 1008 (see FIG. 10). Also, the narrow shoulders 1002 have an angled surface 1006 located between them.

Figure 14A:
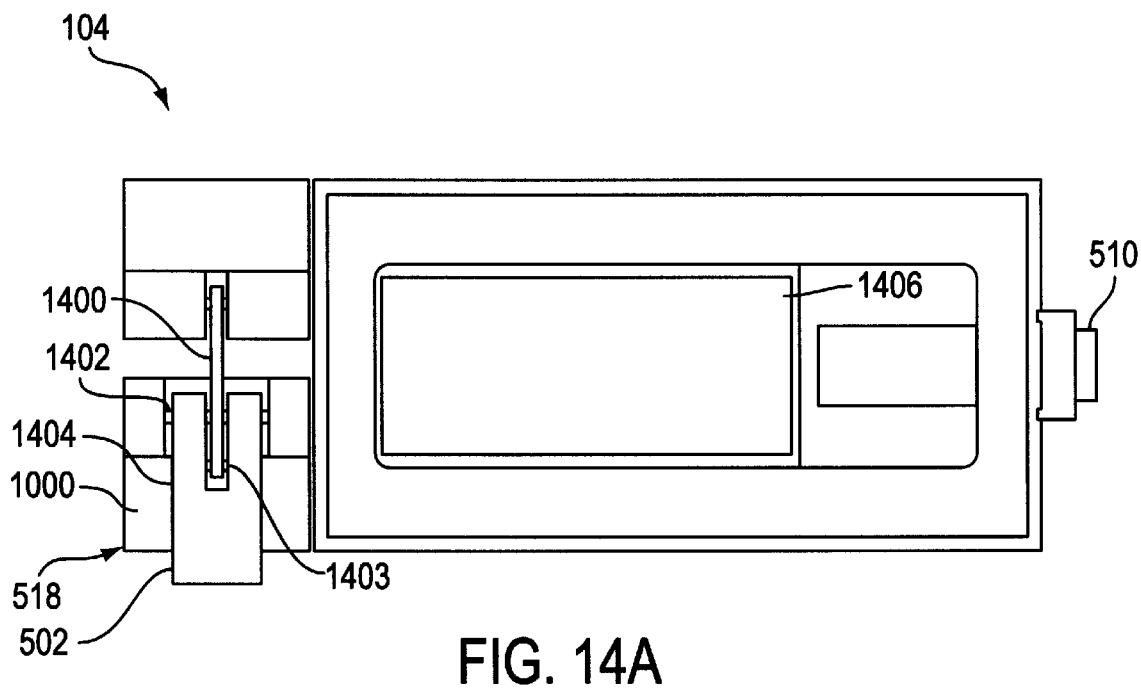
FIGS. 14A–B are bottom views of the housing.
Figure 15A:
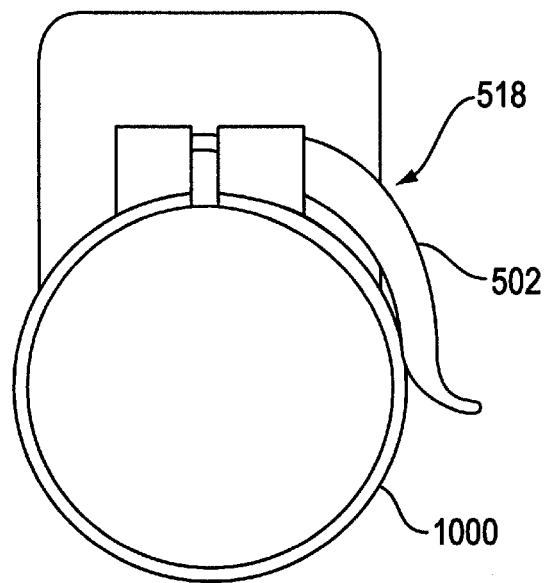
FIGS. 15A–C are end views of the coupler.
Figure 16:
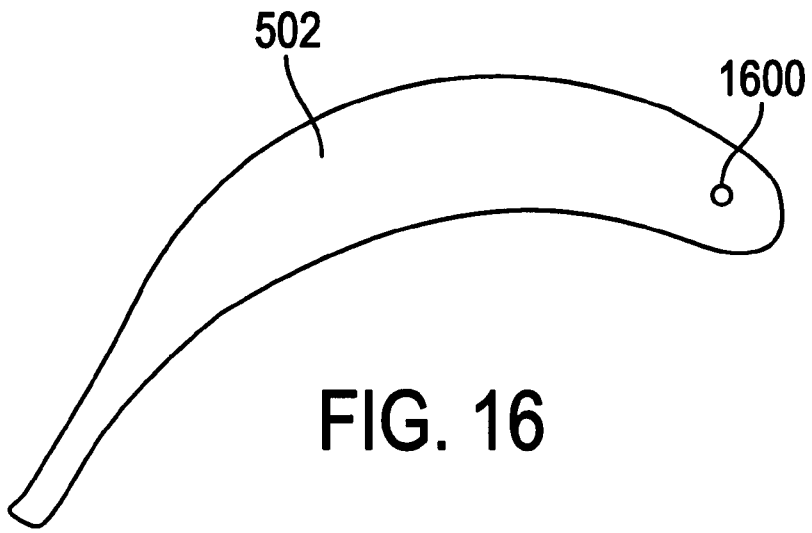
FIG. 16 is a side view of the coupler lever.

As shown in FIGS. 14A and 15A, coupler 104 has a clamping mechanism 518 connected to the split ring 1000. The clamping mechanism 518 includes a lever 502, a wire 1400, and bars 1402 and 1403. The lever 502 includes two legs 1404 with a gap between them, and each leg 1404 includes a hole (not shown). As shown in FIG. 16, the lever 502 also includes a bar 1403 mounted between the legs 1404 in two holes (not shown). While the preferred material for the lever is aluminum, any suitable material may be used.

A bar 1402 is mounted in the holes 1008 of the wide shoulders 1004. Another bar 1402 is mounted in the holes 1008 of the narrow shoulders 1002 and through the holes 1600 in the legs 1404 of the lever 502. This permits pivoting of the lever 502.

Figure 17:
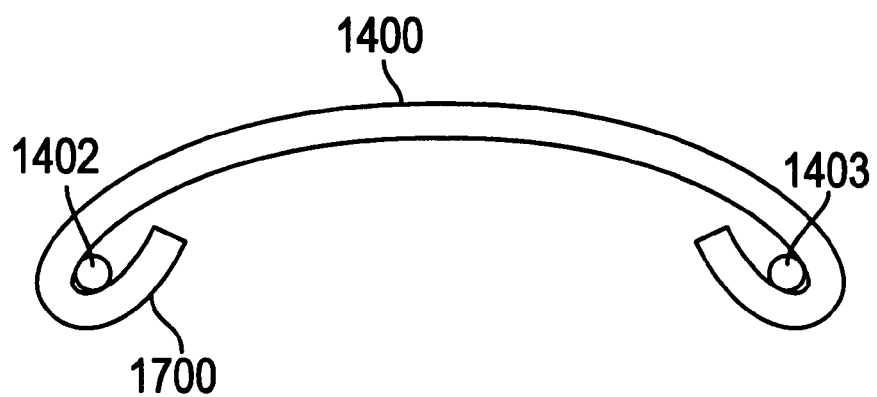
FIG. 17 is a side view of the coupler wire.

As shown in FIG. 17, wire 1400 includes a bent portion 1700 at each end. On one end, the bent portion 1700 is bent around the bar 1402 between the wide shoulders 1004. The other end of the bent portion 1700 is bent around the bar 1403 between the legs 1404 of the lever 502 (see FIG. 14A).

The connections to the bars 1402 and 1403 allow the wire 1400 to move as the lever 502 is pivoted. While the preferred material for the wire and bars is steel, any suitable material may be used.

Figure 14B:
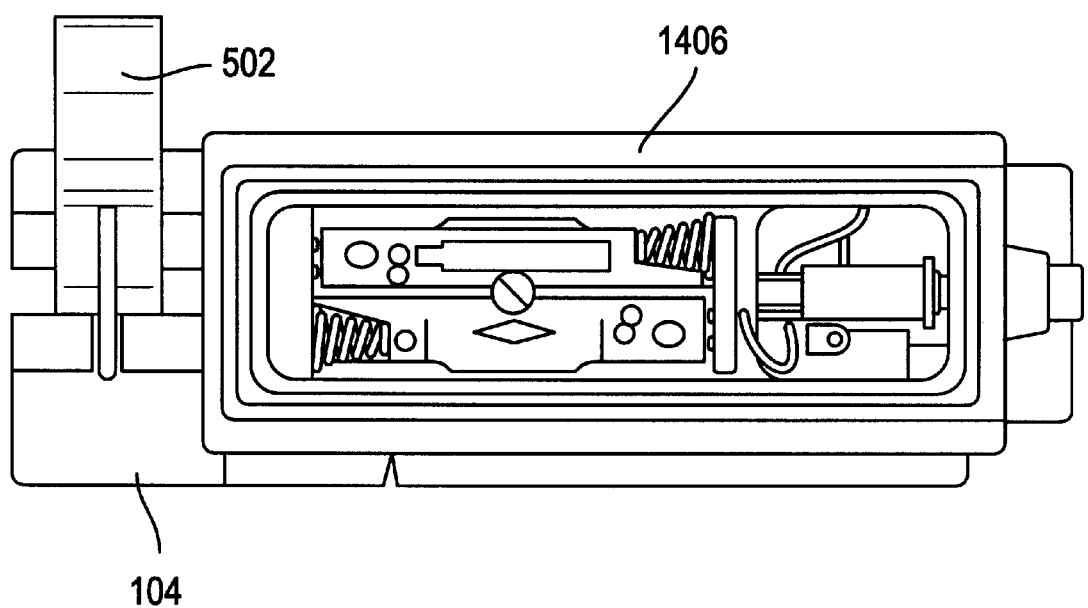
Figure 15B:
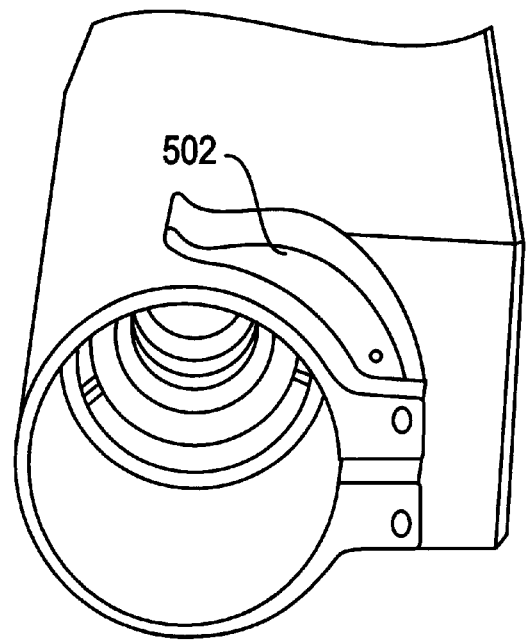
Figure 15C:
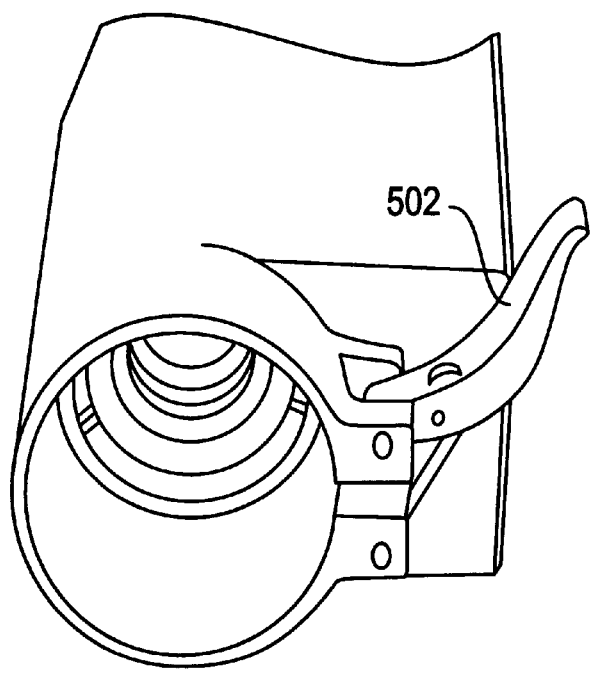

The lever 502 of the clamping mechanism 518 operates between a clamped position (see FIG. 15B) and an unclamped position (see FIG. 15C). It is noted that the preferred spatial arrangement of the lever 502 is shown in FIG. 14A and that an alternative spatial arrangement is shown in FIG. 14B.

To operate the clamping mechanism 518 to couple the housing 102 to an object, the lever 502 is pivoted about the bar 1402. The pivoting movement of the lever 502 pulls the wire 1400, and thus the wide shoulders 1004, toward the narrow shoulders 1002. As the shoulders on the ends of the split ring 1000 get closer to each other, the split ring 1000 contracts, thereby coupling the coupler 104 to the object in the coupler 104 (such as an end of the rifle scope 106). The angled surface 1006 located between the narrow shoulders 1002 allows the lever 502 to pivot and clamp against the housing 102.

In order to release the rifle scope 106 from the coupler 104, the operation described above is reversed. The lever 502 is lifted upwardly, moving wire 1400 away from the narrow shoulders 1002, and allowing the pairs of shoulders 1002 and 1004 to move apart.

Figure 18:
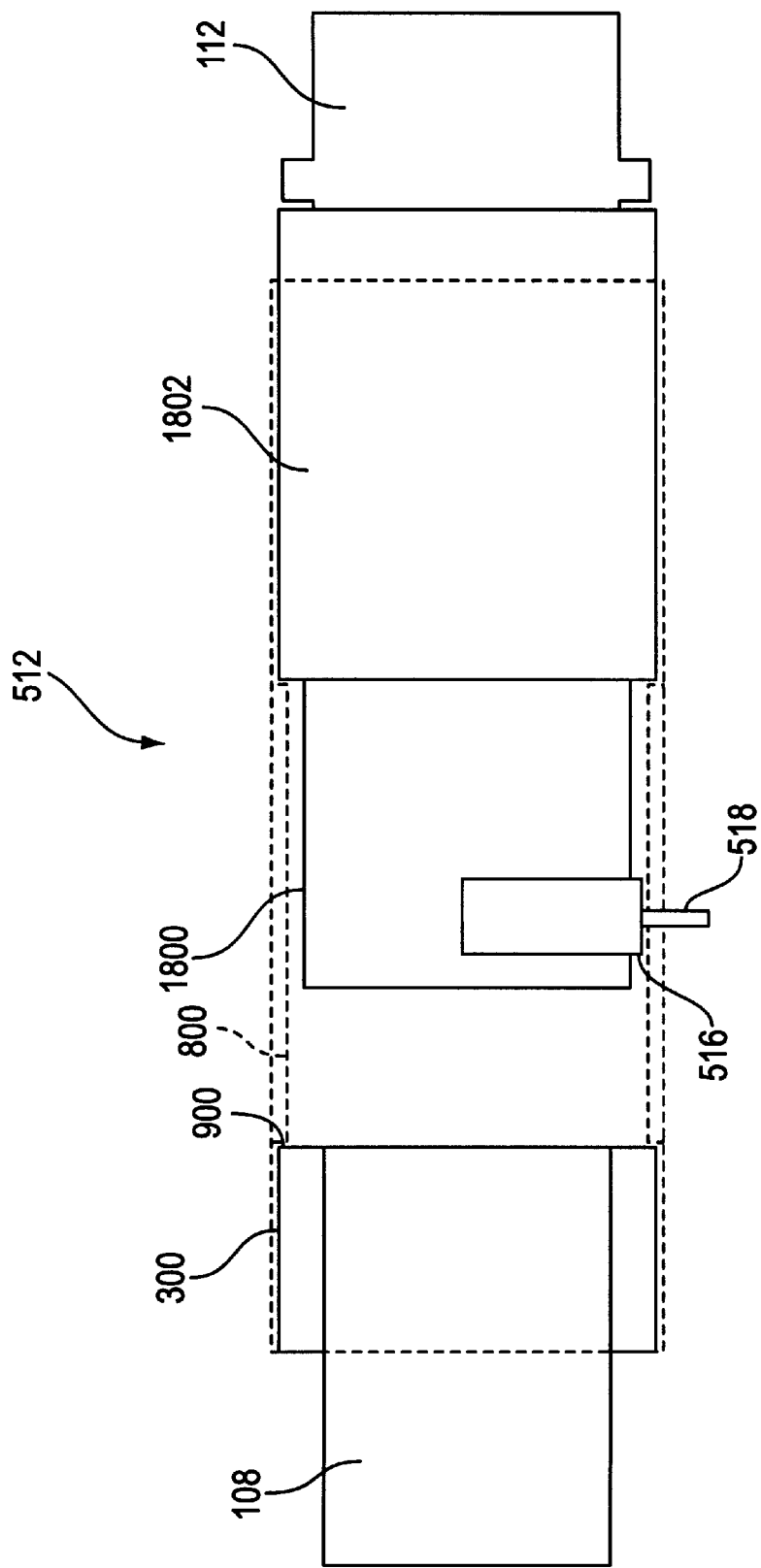
FIG. 18 is a schematic view of the image intensifying modular accessory device, sleeve, and optical device.
Figure 19A:
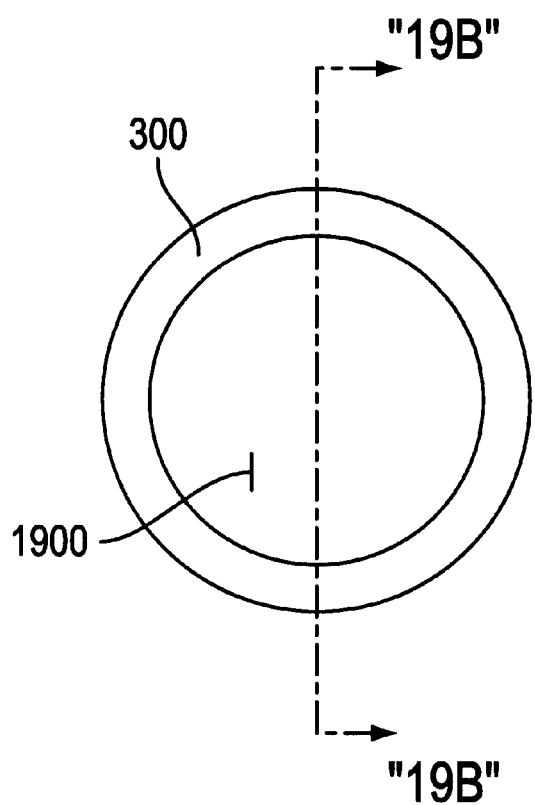
FIGS. 19A–B are end and cross-sectional views of the coupler sleeve.
Figure 19B:
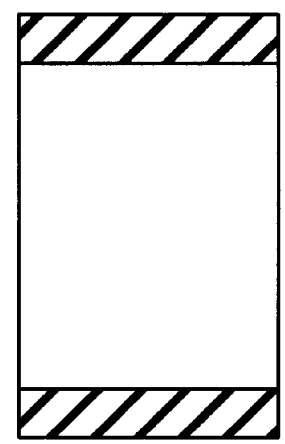

The housing 102 may be coupled to objects that vary in diameter by using a coupler sleeve 300. As shown in FIGS. 19A and 19B, coupler sleeve 300 has a bore 1900 which may be made with different inside diameters to allow for mounting of the housing 102 to a variety of optical devices. In operation, a coupler sleeve 300 is mounted on the end 108 of the rifle scope 106 (see FIG. 4). As shown in FIG. 18, the coupler sleeve 300 and end 108 are then slid into the split ring 1000 and bore 800. The insertion of the coupler sleeve 300 and end 108 into the bore 800 is limited by shoulder 900.

It is contemplated that a lip (not shown) may be formed along the inner surface of the bore 1900 at an end of the coupler sleeve 300. This lip would limit the movement of the end 108 of the rifle scope 106 in the coupler sleeve 300. While the preferred material of the sleeve is rubber, any suitable material may be used.

In the illustrated embodiment, the image intensifying modular accessory device 512 is inserted into bore 800 of the housing 102. Extending out of the left side of the bore 800 (as oriented in FIG. 18) is the end 108 of the rifle scope 106 and out of the right side of the bore 800 is the image intensifying modular accessory device 512. The image intensifying cartridge 1802 is inserted into the bore 800 until it abuts shoulder 900. The image intensifying cartridge 1802 can be fixed to the housing 102 by set screws (not shown) in holes 904, as described with respect to FIG. 9.

The image intensifying modular accessory device 512 is shown generally in FIG. 18. The image intensifying modular accessory device 512 includes an objective lens 1800, an image intensifying cartridge 1802, an image intensifying tube 604, a tension ring 606, and an eyepiece 112. The image intensifying cartridge 1802 has a threaded opening on each end 2004 and 2006 (see FIG. 20B). The objective lens 1800 has a threaded end 2502 that is threaded into end 2004 of the image intensifying cartridge 1802. After the image intensifying tube 604 is inserted into the cartridge 1802, the tension ring 606 is threaded into the opening on end 2006. Finally, a threaded end 2802 of eyepiece 112 is threaded into the end 2006 of the image intensifying cartridge 1802.

Figure 25:
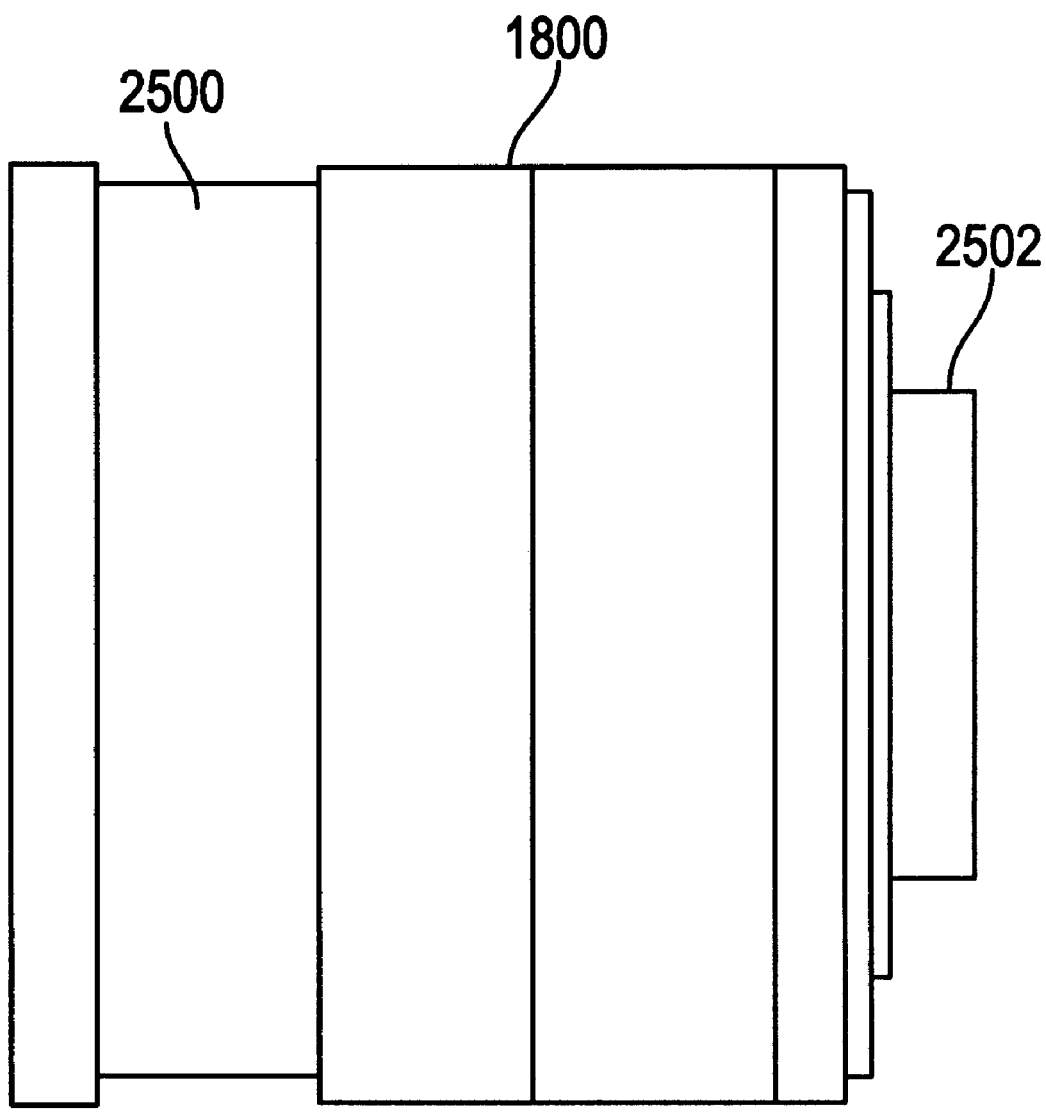
FIG. 25 is a side view of the objective lens.

As shown in FIG. 25, the objective lens 1800 is located at one end of the modular accessory device 512. The objective lens 1800 includes a groove 2500 around the perimeter for the connection of a lens focus mount 516. It is understood that one skilled in the art is familiar with an objective lens and that any appropriate objective lens may be used.

The objective lens 1800 may be focused by a lens focus mount 516 and lens focus handle 518 (see FIGS. 26A–27). Preferably, the lens focus mount 516 is arc shaped and has a hole 2600 for receiving the lens focus handle 518. The lens focus mount 516 includes an inner surface 2602 with the same radius of curvature as the outer surface of the groove 2500 and is mounted in the groove 2500 of the objective lens 1800. The lens focus mount 516 is connected to the objective lens 1800 by an epoxy or other suitable adhesive.

As shown in FIG. 27, the lens focus handle 518 includes threads on the outside of an end 2702. The end 2702 is threaded into the hole 2600 on the lens focus mount 516. The objective lens 1800 may be focused if necessary by moving the lens focus handle 518 circumferentially about the optical axis to axially move an internal lens (not shown) with respect to the connection with the image intensifying cartridge 1802. The lens focus handle 518 extends outwardly from the housing 102 through slot 514 (see FIG. 5B). While the slot 514 may be any length, preferably, the slot 514 is a 110° arc along the body 103 of the housing 102.

While a threaded connection between the lens focus handle 518 and the lens focus mount 516 is preferred, any suitable type of connection may be used. In the preferred embodiment the lens focus mount is made of aluminum, however, any suitable material may be used.

Figure 20A:
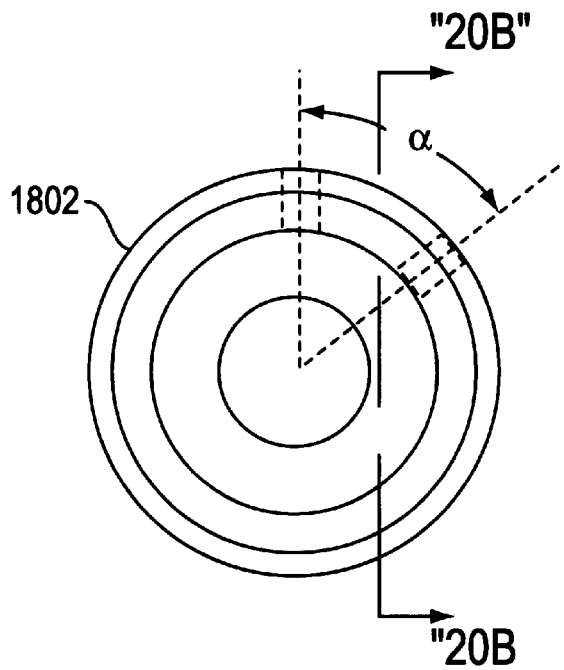
FIGS. 20A–B are end and cross-sectional views of the image intensifying cartridge.
Figure 20B:
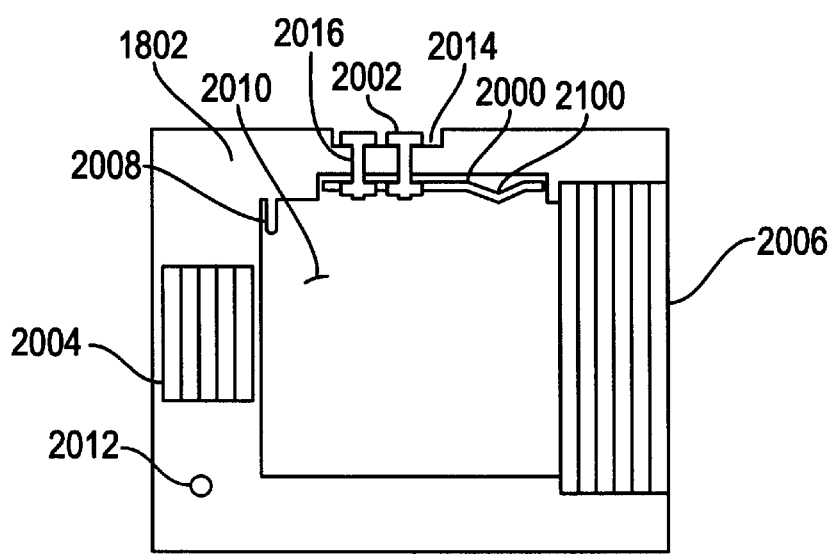

As shown in FIG. 20B, the image intensifying cartridge 1802 includes a compartment 2010 into which the image intensifying tube 604 is inserted. As discussed previously, the cartridge 1802 has one end 2004 that has a small threaded opening and another end 2008 that has a large threaded opening. The cartridge 1802 also includes four holes 2012 spaced around the circumference of the cartridge 1802. These holes 2012 receive the set screws (not shown) to hold the cartridge 1802 in place in the bore 800.

The cartridge 1802 includes two power clips 2000 mounted to the inside surface. Each power clip 2000 is connected to the cartridge 1802 by metal connectors 2002 that are mounted in holes 2016. A cavity 2014 is provided to maintain the tops of the metal connectors 2002 below the level of the outside surface of the cartridge 1802 to facilitate disposing the cartridge 1802 in the bore 800.

Figure 21:
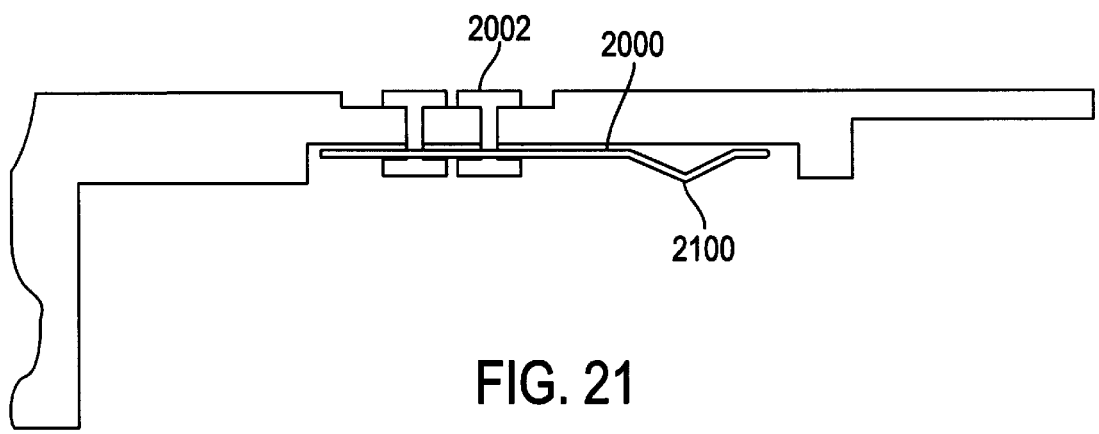
FIG. 21 is a close-up view of the mounting of the power clip.
Figure 22B:
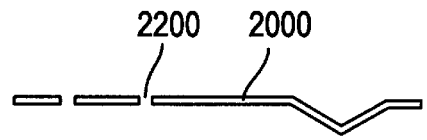
FIGS. 22A–B are top and cross-sectional views of the power clip.
Figure 22A:
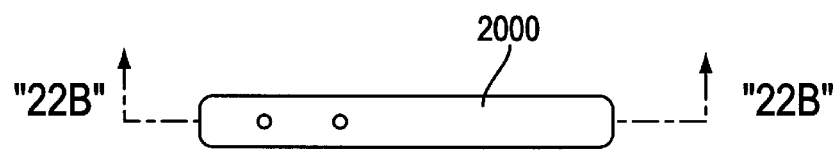

As shown in FIGS. 21–22A, the power clip 2000 includes an angled portion 2100 and two mounting holes 2200. It is noted that any appropriate number of holes 2200 and metal connectors 2002 may be used to secure the power clips 2000 to the cartridge 1802. As shown in FIG. 20A, the power clips are located at an angle a apart. Preferably, angle a is 60 degrees, but any appropriate angle may be used.

Figure 23A:
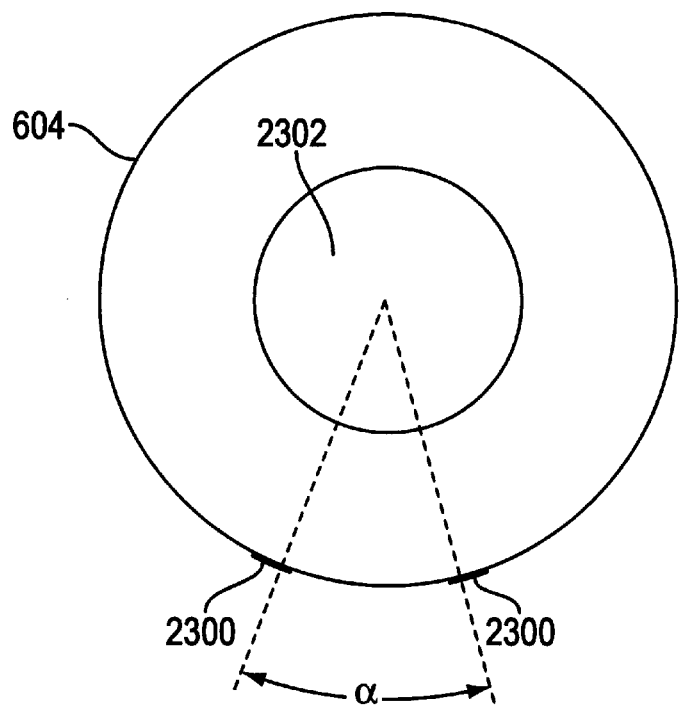
FIGS. 23A–B are front and side views of the image intensifying tube.
Figure 23B:
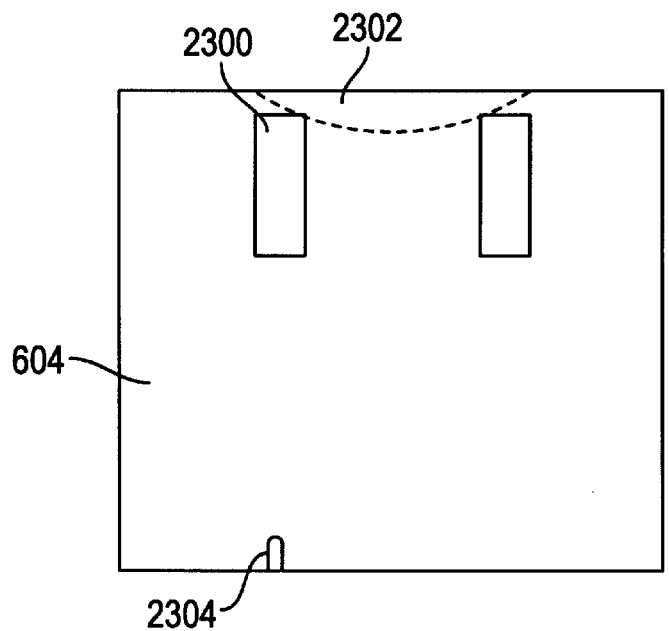

Referring the FIGS. 23A and 23B, the image intensifying tube 604 is shown. One end of the image intensifying tube 604 has a concave surface 2302. At the other end, there is a photocathode plane (not shown) inside the image intensifying tube 604. The image intensifying tube 604 also has two contact plates 2300 mounted at the same angle $\alpha$ as the power clips 2000.

The image intensifying tube 604 also includes a notch 2304 that is engaged by pin 2008 (see FIG. 20B) on the inside of cartridge 1802 when the tube 604 is inserted into the cartridge 1802. When the pin 2008 engages the notch 2304, any relative rotational movement between the image intensifying tube 604 and the cartridge 1802 is prevented. Thus, the power clips 2000 and the contact plates 2300 are maintained in contact with each other.

It is to be understood that image intensifying tubes are known in the art and any suitable tube may be used. While the preferred material of the image intensifying cartridge 1802 is delrin, any suitable material may be used.

Figure 24A:
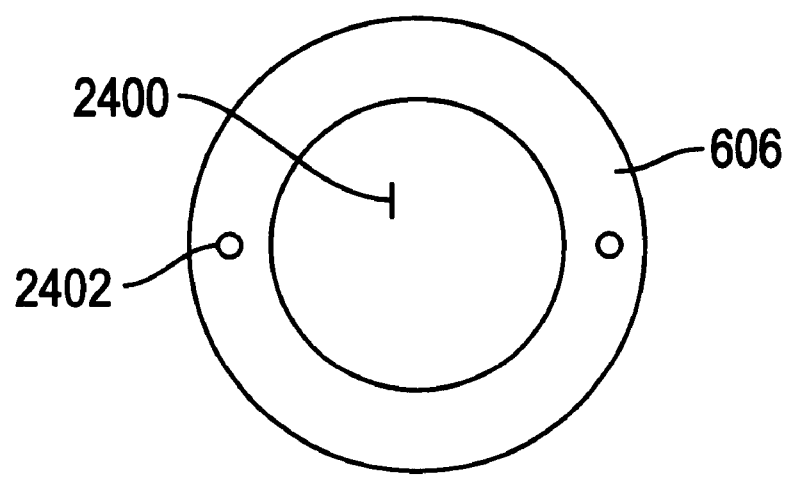
FIGS. 24A–B are top and side views of the tension ring.
Figure 24B:

As shown in FIG. 24A, the outer surface of the tension ring 606 is threaded and, as previously discussed, the ring 606 is threaded into end 2006 of the image intensifying cartridge 1802. The tension ring 606 defines a central bore 2400 and two indentations 2402 on the body of the tension ring 606.

When installed in the image intensifying cartridge 1802, the tension ring 606 serves to hold the image intensifying tube 604 in cartridge 1802. The two indentations 2402 allow a tool to be used to rotate the tension ring 606 so that it may be screwed in and out easily. While the preferred material of the tension ring 606 is delrin, any suitable material may be used.

Figure 28A:
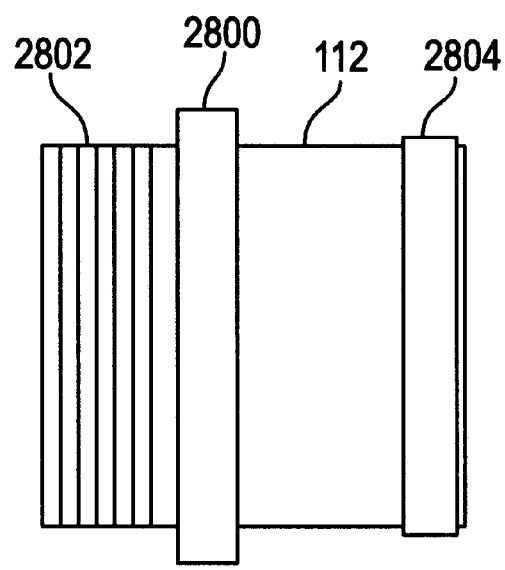
FIGS. 28A–B are side and front views of the eyepiece.
Figure 28B:
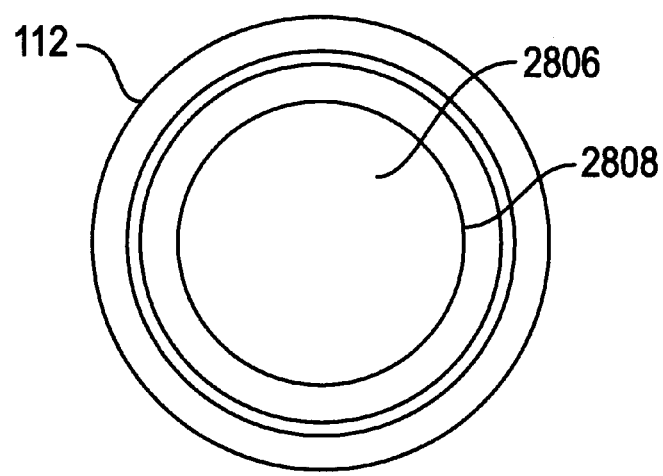

Once the tension ring 606 is installed, the eyepiece 112 is connected to the image intensifying cartridge 1802. As shown in FIGS. 28A and 28B, the eyepiece 112 includes a threaded end 2802, a shoulder 2800, a gripping surface 2804 at another end, a bore 2808, a lens 2806 disposed inside the bore 2808.

The threaded end 2802 is threaded into the opening in end 2006 of the cartridge 1802. The gripping surface 2804 may be used to facilitate the adjustment of the position of the eyepiece 112 relative to the cartridge 1802. It is understood that one with ordinary skill in the art is familiar with an eyepiece and that any appropriate eyepiece may be used.

In the illustrated embodiment, a power supply 500 is connected to the housing 102 (see FIGS. 14A and 14B). The power supply 500 includes a battery compartment 508, a battery holder 1406, a battery compartment lid 602 (see FIG. 6), a lid screw 3300 (see FIG. 33), and batteries (not shown).

Figure 34:
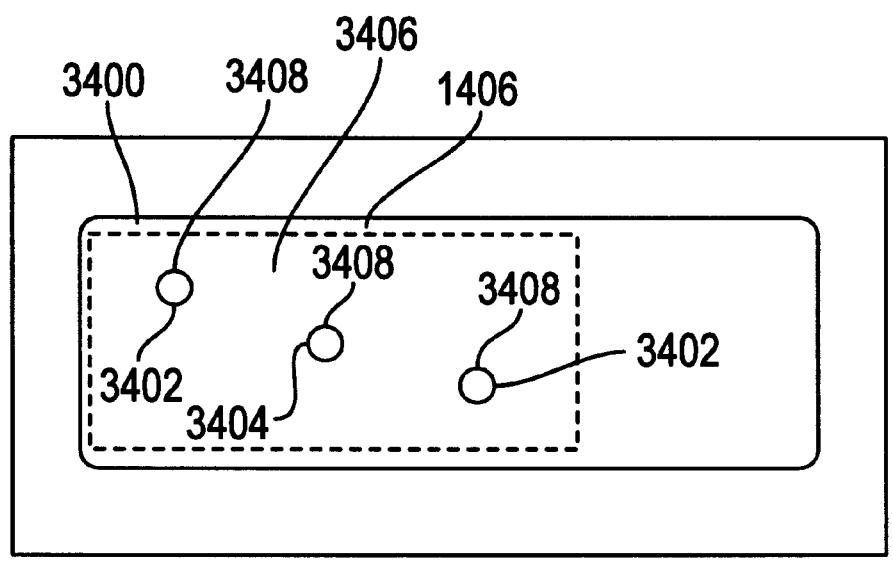
FIG. 34 is a bottom view of the battery compartment and the battery holder.
Figure 35:
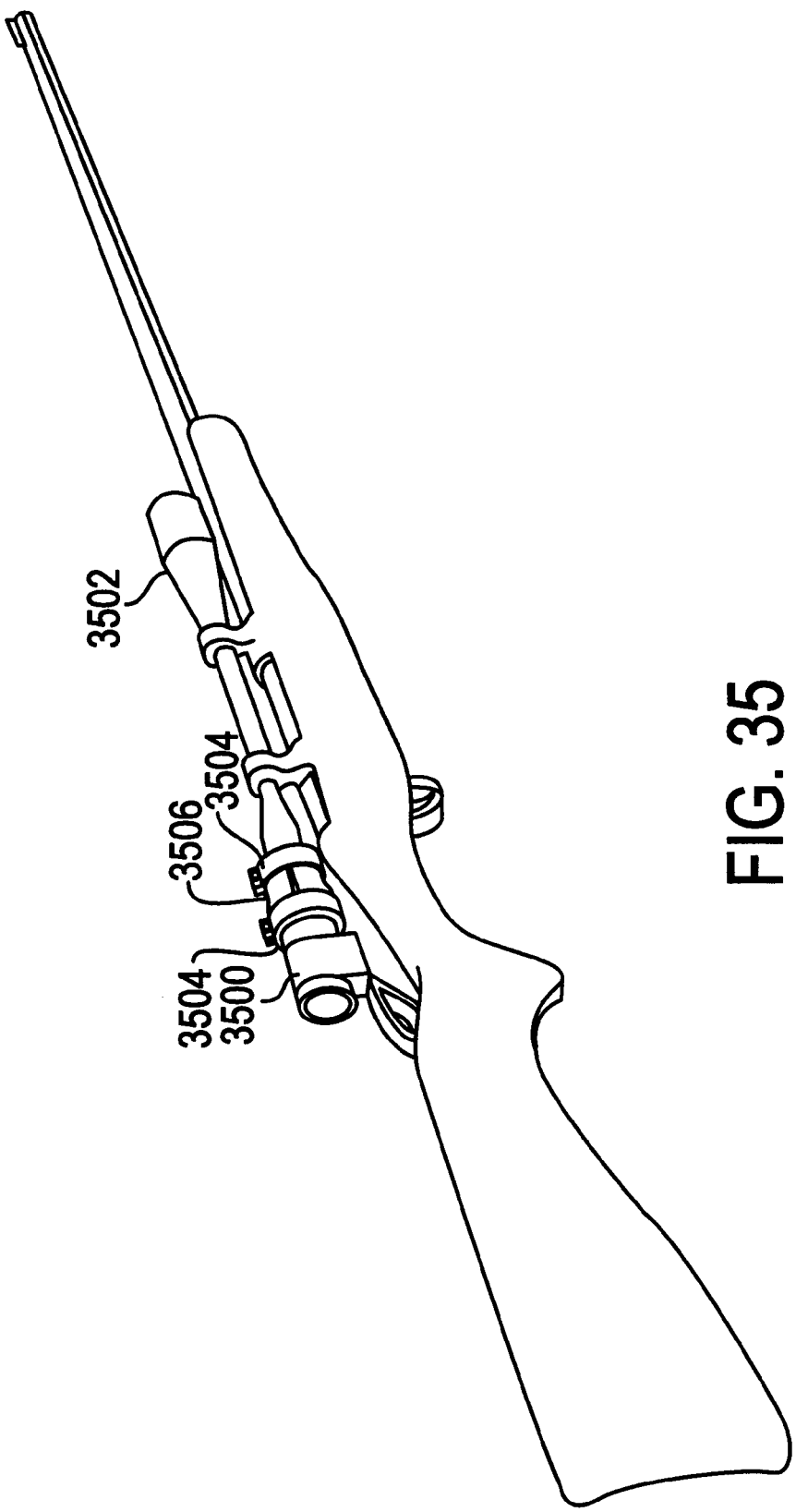
FIG. 35 is a perspective view of a prior art optical accessory and separate coupler mounted to a rifle scope.
Figure 36A:
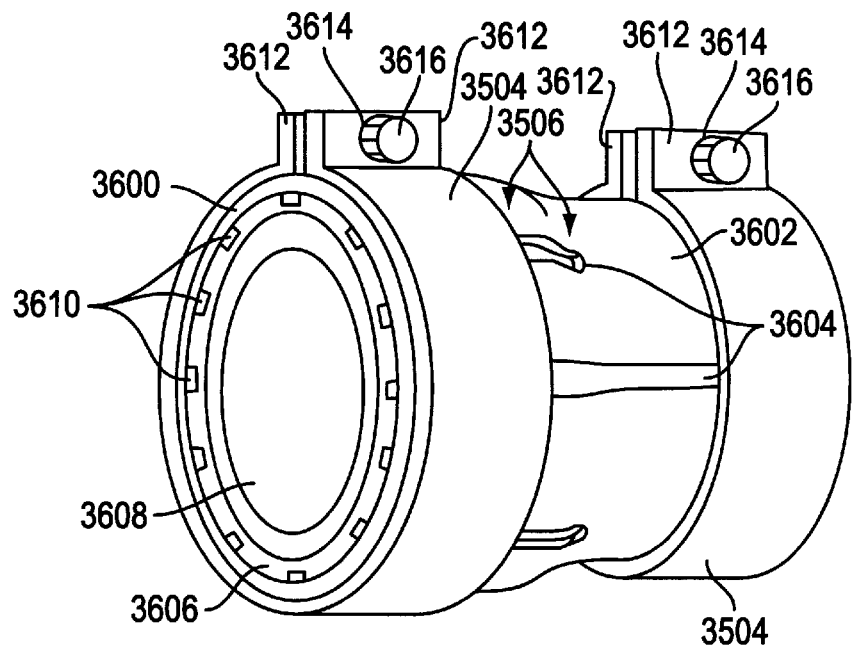
FIGS. 36A–B are a perspective and side views of the prior art coupler of FIG. 35.
Figure 36B:
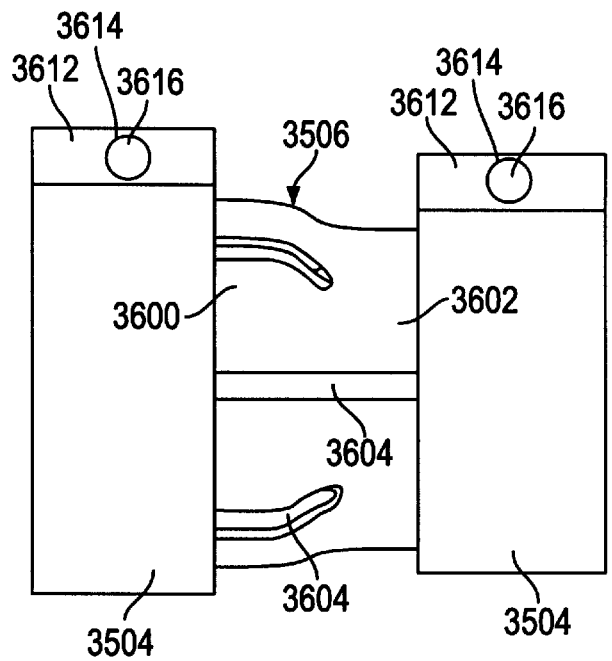
Figure 37A:
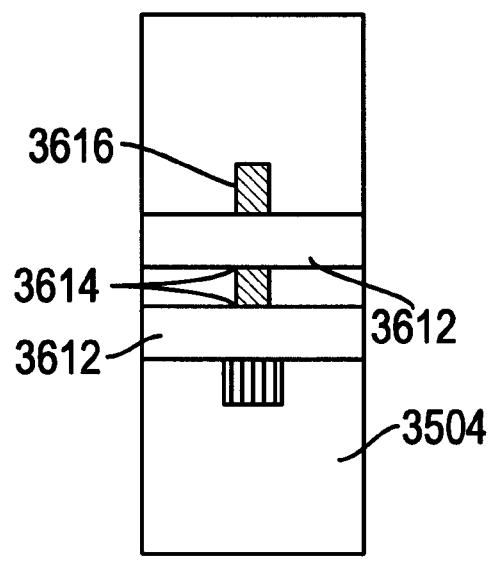
FIGS. 37A–B are side and end views of the prior art coupler's compression band.
Figure 37B:
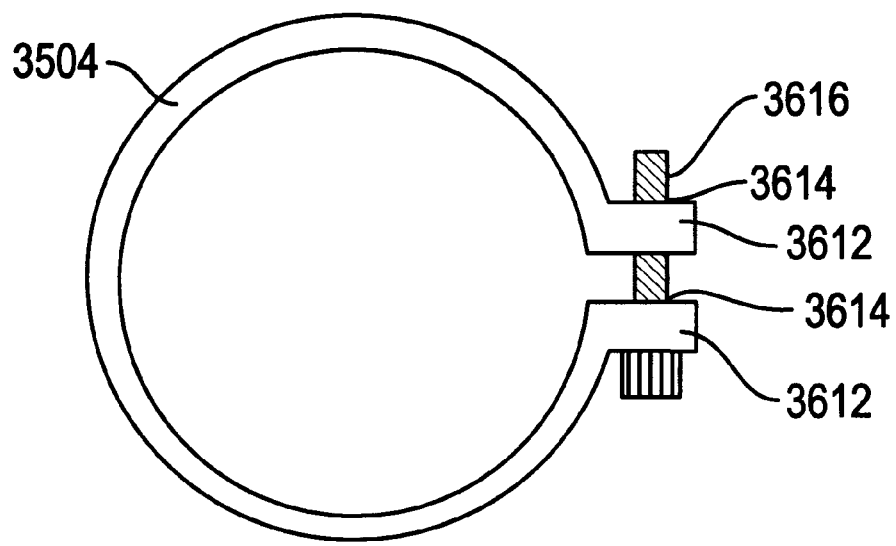

As discussed previously, housing 102 includes a generally cylindrical body 103 with a battery compartment body 508 projecting from its top side. As shown in FIG. 34, the battery compartment 508 includes a bottom surface 3400 having two studs 3402 and a hole 3404 for a screw (not shown). The battery holder 1406 includes a bottom surface 3406 having three holes 3408. Preferably, as the battery holder 1406 is placed into the battery compartment 508, two holes 3408 are aligned with studs 3402. Then the battery holder 1406 is secured by a screw (not shown) that is mounted through a hole 3408 and into hole 3404. The preferred embodiment of the battery holder 1406 uses two batteries (not shown). It is noted that the number of batteries used may vary.

Figure 30:
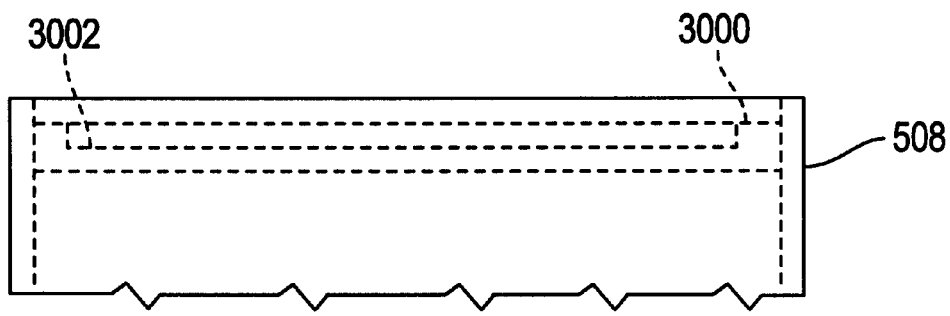
Figure 31:
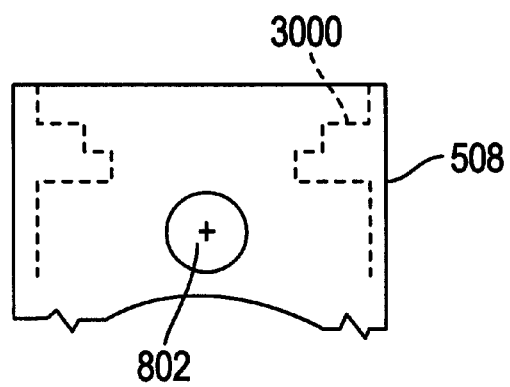

As shown in FIG. 30, the battery compartment 508 has a shoulder 3000 on which a battery compartment lid 602 is mounted to seal the compartment 508. Adjacent the shoulder 3000 is groove 3002 for an O-ring (not shown) to seal the battery compartment 508 when lid 602 is mounted. Preferably, the lid 602 and groove 3002 have matching radiused corners and the lid 602 includes a bottom surface 3202 that matches the shoulder 3000 of the battery compartment 508 (see FIG. 32B). The matching structures facilitate the complete sealing of the compartment 508 from any external elements.

Figure 29:
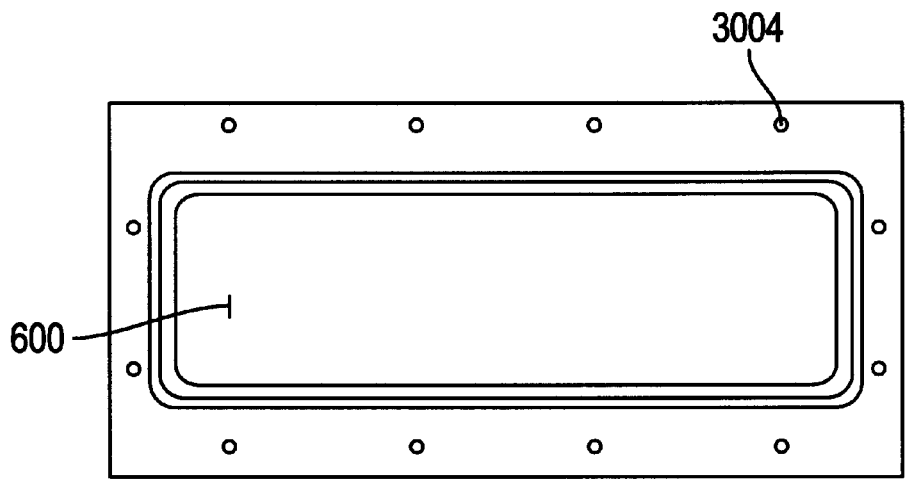
FIGS. 29–31 are bottom, side, and end views of the battery compartment.
Figure 32A:
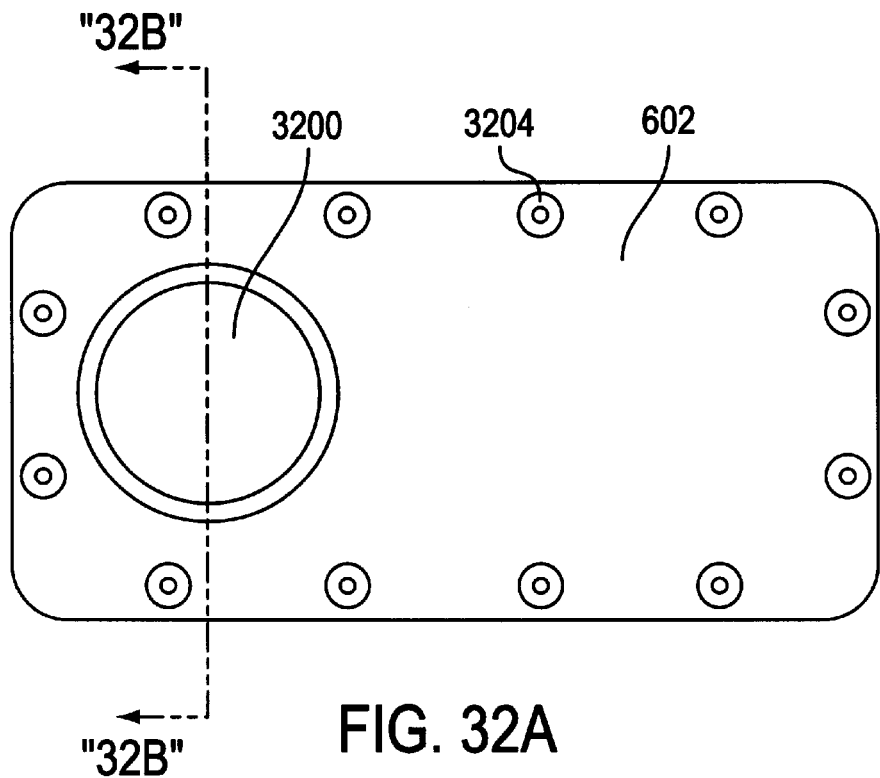
FIGS. 32A–B are bottom and cross-sectional views of the battery compartment lid.
Figure 32B:
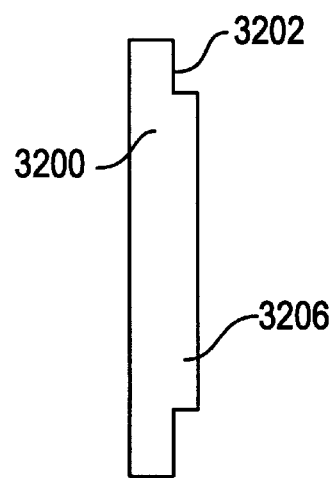
Figure 33A:
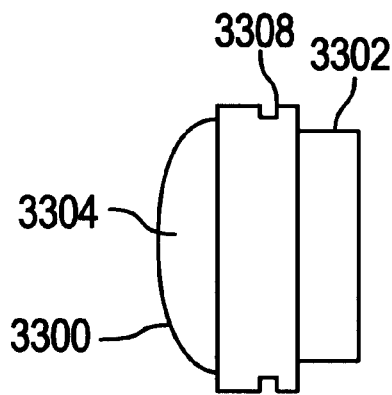
FIGS. 33A–B are side and top views of the lid screw.
Figure 33B:
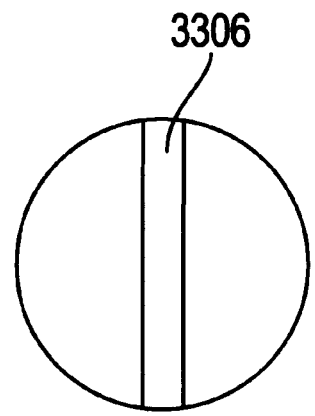

As shown in FIG. 29, the battery compartment 508 includes mounting holes 3004 located around the shoulder 3000 for the connection of the battery compartment lid 602. Preferably, the mounting holes 3004 are threaded. As shown in FIG. 32A, the lid 602 also includes countersunk holes 3204 that are aligned with the mounting holes 3004. Screws (not shown) or any other suitable fasteners may be used to connect the battery compartment lid 602 to the battery compartment 508.

In order to replace a battery without removing the lid 602, a hole 3200 is provided in the lid 602. The hole 3200 has a threaded portion 3206 (see FIG. 32B). A lid screw 3300 is screwed into the hole 3200 to seal the compartment 508. The lid screw 3300 includes a threaded end 3302 and an operating end 3304. The threaded end 3302 has threads that match the threads of the threaded portion 3206 of hole 3200. The securing and removal of the lid screw 3300 is facilitated by a handle 3306 on the operating end 3304. A user's thumb and finger may be used to grip handle 3306 to turn the lid screw 3300. The lid screw 3300 also includes a groove 3308 around its circumference. An O-ring (not shown) may be inserted into groove 3308 to seal the connection between the lid screw 3000 and the battery compartment lid 602.

Thus, if a battery needs to be replaced, lid screw 3300 is removed from the battery compartment lid 602 and the operator may place a finger through hole 3200 and remove the battery. This procedure is reversed to insert a battery. While the preferred material for the battery compartment lid and the lid screw is aluminum, any suitable material may be used.

Figure 8:
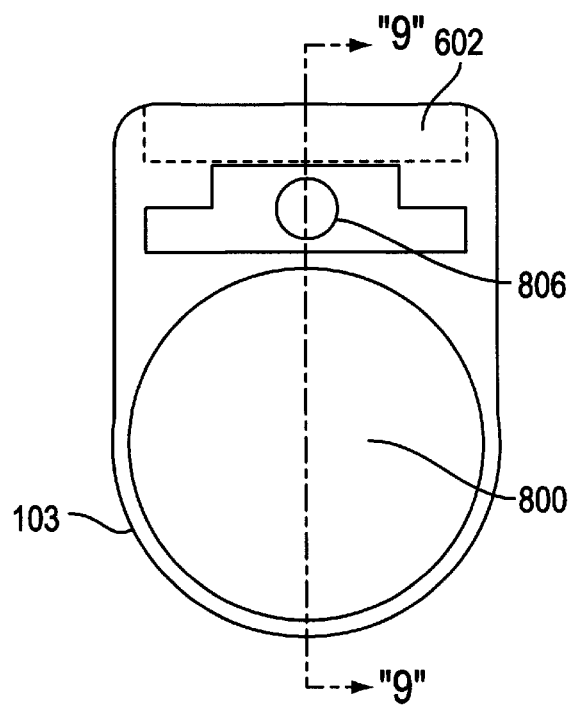

As shown in FIGS. 8 and 9, the battery compartment 508 has a hole 802 in the rear side wall 511 for the power switch 510. When the power switch 510 is its operative position, the batteries supply current by way of wiring (not shown) to the power clips 2000, the contact plates 2300, and eventually the image intensifying tube 604.

Now the operation of the preferred embodiment will be discussed. Initially, batteries (not shown) are inserted into the battery holder 1406 that is connected to the bottom surface 3400 of the battery compartment 508. An O-ring (not shown) is installed in groove 3002. The battery compartment lid 602 is then fastened to the battery compartment 508. The lid screw 3300 is then secured to the battery compartment lid 602, thereby sealing the battery compartment 508.

The image intensifying tube 604 is placed into the compartment 2010 of the image intensifying cartridge 1802 with the pin 2008 engaging the notch 2304 as previously discussed. Next, the objective lens 1800 is threaded into an opening on end 2004 of the image intensifying cartridge 1802. Then, tension ring 606 and subsequently the eyepiece 112 are threaded into an opening on end 2006 of the image intensifying cartridge 1802.

The objective lens 1800, image intensifying cartridge 1802, and eyepiece 112 assembly are inserted into bore 800 of housing 102 until the image intensifying cartridge 1802 engages the shoulder 900 in the bore 800. Set screws (not shown) are inserted into holes 904 in the side of the bore 800 of the housing 102 and holes 2012 in the image intensifying cartridge 1802 to secure the cartridge 1802 within the bore 800.

Next, coupler sleeve 300 is slid onto the end 108 of the rifle scope 106 until an end of the coupler sleeve 300 is flush with the edge of the end 108 (see FIG. 4). The housing 102 is coupled to the coupler sleeve 300 and the rifle scope 106 at this time. When the lever 502 of the clamping mechanism 518 is in an upward or unclamped position, the coupler 104 of the housing 102 is slid over the coupler sleeve 300 until the end of the coupler sleeve 300 abuts the shoulder 900 in the bore 800. Next, lever 502 is pivoted downwardly, pulling the pairs of shoulders 1002 and 1004 closer together and contracting ring 1000 onto the coupler sleeve 300.

The power switch 510 is pressed to its "on" position and contact is made between the batteries and the metal connectors 2002. The metal connectors 2002 are connected to the power clips 2000 which are in turn connected to the contact plates 2300 on the image intensifying tube 604. This arrangement supplies power from the batteries to the image intensifying tube 604 to energize the tube 604 so that any ambient light received through the objective lens 1800 is intensified. As a result, an operator looks into the end of the eyepiece 112 and can use the rifle scope 106 for night use since the ambient light reflected from the object being viewed is intensified.

While the preferred embodiment of the invention utilizes an image intensifying modular accessory device that intensifies light waves to enable the operator to see images in a darkened environment, other modular accessory devices are contemplated as well. For example, a thermal modular accessory device may be interchanged with the image intensifying modular accessory device. Furthermore, an image pickup modular accessory device may be interchanged with the image intensifying modular accessory device.

The optical accessory of the present invention may be used with a variety of optical devices. It is contemplated that these optical devices may include the scope of a weapon, a telescope, binoculars, or any other optical devices.

Also, the eyepiece 112 of the present invention may be viewed by many things such as a human eye, a video camera recorder, or another optical device. It is further contemplated that the optical accessory 100 of the present invention may be used as a stand alone monocular.

A prior art optical accesory and separate coupler are shown in FIGS. 35 through 40B. The prior art system is also used to modify an existing optical device for night use. The prior art system includes an image intensifying device 3500, an optical device 3502, a coupler 3506, and compression bands 3504. For purposes of this system, the image intensifying device 3500 and the optical device 3502 are self-contained. The prior art coupler 3506 and prior art compression bands 3504 are used between the instruments 3500 and 3502 to mount them together.

The coupler 3506 includes first and second ends 3600 and 3602. As shown, the optical device 3502 is temporarily connectable to the first end 3600 of the coupler 3506 and the image enhancement device 3500 is temporarily connectable to the second end 3602 of the coupler 3506.

The coupler 3506 has a generally tubular shape and is hollow. The coupler 3506 is separated into two approximately equal portions, the first end 3600 and the second end 3602, both ends 3600 and 3602 being adapted for temporary connection to the instruments 3500 and 3502.

The diameter of the first end 3600 may be different than the diameter of the second end 3602 in order to accommodate different diameters of instruments 3500 and 3502. The coupler 3506 includes a plurality of longitudinal slits 3604. Some of the slits 3604 originate at the first end 3600 of the coupler 3506, while others originate at the second end 3602. Each slit 3604 extends approximately two-thirds of the length of the coupler 3506.

The prior art coupler 3506 needed some rigidity to maintain its structural integrity. A lightweight material was preferred, such as aluminum, which had been anodized to increase longevity and aesthetic appearance.

Adjustable compression bands 3504 are included at each end 3600 and 3602 of the coupler 3506 to connect the instruments 3500 and 3502 to the coupler 3506. Since each compression band 3504 is, or may be, identical to the other, only one compression band 3504 is described.

The compression band 3504 is substantially circular and includes two ends 3612 configured so as to be selectively brought closer together or driven further apart. Each end 3612 of the compression band 3504 has an aperture 3614 that is threaded. The compression band 3504 is adjustable by a screw 3616 that engaged in the apertures 3614 of the ends 3612. As the screw 3616 is adjusted, the diameter of the compression band 3504 is either increased or decreased.

When device 3500 or 3502 is inserted into the compression band 3504, the screw 3616 is adjusted to bring the ends 3612 together, thereby decreasing the diameter of the compression band 3504. When the operator wants to remove device 3500 or 3502 from the coupler 3506, the above procedure is reversed.

Several prior art sleeves 3606 are shown. The sleeves 3606 are used at each end of the coupler 3506 and since they may be identical in construction, only one will be described. The sleeve 3606 is generally circular in cross-section, except for a longitudinal break 4000, shown in FIGS. 40A and 40B, which makes the sleeve 3606 somewhat adjustable in diameter.

The sleeves 3606 are constructed of a semi-rigid material such as that used in the construction of the coupler 3506. Advantageously, the sleeve includes an interior gripping surface 3608 disposed along the interior surface of the sleeve 3606. The gripping surface 3608 facilitates the gripping of the instruments 3500 and 3502 during use. As shown, the sleeves 3606 are sized to fit into both ends 3600 and 3602 of the coupler 3506.

An O-ring 3900 is placed within the coupler 3506. The O-ring 3900 is seated in approximately midway between the ends 3600 and 3602 of the coupler 3506 and serves to cushion the image intensifying device 3500 from any recoil (known as "kick") of the weapon as it is fired.

Now the operation of the prior art system is described. The first end 3600 of the coupler 3506 receives an end of the optical device 3502 such that the gripping surface 3608 grasps the optical device 3502. The adjustable compression band 3504 surrounding the first end 3600 of the coupler 3506 is then tightened by adjusting the screw 3616, thereby drawing the ends 3612 of the compression band 3504 together to grasp the optical device 3502. Similarly, an end of the image intensifying device 3500 is inserted into the second end 3602 of the coupler 3506. The compression band 3504 is tightened around the device 3500 by manipulating the screw 3616 of the compression band 3504.

Prior to connecting the coupler 3506 to the optical device 3502, the optic device 3502 may be advanced forward to allow more room for the additional length contributed by the image intensifying device 3500 and the coupler 3506.

The optical device 3502 and image intensifying device 3500 are connected together easily and quickly. The addition of the image intensifying device 3500 to an existing optical scope will not affect the sighting of the optical scope.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

I claim:

1. A method for converting an existing optical device for nighttime use without modification of the existing optical device, the method comprising the steps of:

providing an image intensifying system, said system having a housing, said housing having an integral clamping mechanism located at one end thereof and said housing having first and second internal cavities;

disposing an image intensifying instrument in said first internal cavity within said housing;

disposing an adjustable objective lens between said image intensifying instrument and said integral clamping mechanism within said first internal cavity;

disposing an eyepiece lens at an end of said housing opposite said clamping mechanism;

disposing a power source for the image intensifying instrument in said second internal cavity and operably coupling said power source to said image intensifying instrument; and securing said clamping mechanism to an end of the optical device to enable nighttime use of said optical device.

2. The method of claim 1, wherein the clamping mechanism comprises a split compression ring and an actuation bar wherein said step of securing said clamping mechanism to an end of the optical device comprises moving said actuation bar to cause said split compression ring to compress to clampingly retain the end of said optical device.

3. An optical accessory adapted to be attached to an eyepiece of an optical device without modification of the optical device, the optical accessory comprising:

a housing having a first internal cavity disposed therein;

said housing having an integral coupler adapted to be clampingly coupled to the eyepiece of the optical device; and an image modification module disposed in said housing and operable to receive and modify an image transmitted outwardly from the eyepiece of the optical device.

4. The optical accessory of claim 3, said accessory further comprising an adjustable objective lens disposed between said image modification module and said integral clamping mechanism within said first internal cavity.

5. The optical accessory of claim 4, said accessory further comprising an accessory eyepiece lens disposed at an end of said housing opposite said integral clamping mechanism.

6. The optical accessory of claim 4, said housing further comprising a second internal cavity disposed therein, wherein a power source for the image modification module is disposed in said second internal cavity.

7. The optical accessory of claim 4, said housing further comprising a second internal cavity disposed therein, wherein a power source for the image modification module is disposed in said second internal cavity.

8. The optical accessory of claim 7, wherein said housing further comprises a power switch extending from said second internal cavity and coupled to said power source.

9. The optical accessory of claim 4, wherein said adjustable objective lense includes a an adjuster and wherein said housing includes a slot through which said adjuster protrudes to allow adjustment of said adjustable objective lens.

10. The optical accessory of claim 3, wherein said clamping mechanism comprises a split compression ring and an over-center actuation bar.

11. The optical accessory of claim 10, wherein said clamping mechanism further comprises a wire attached to said split compression ring and said over-center actuation bar, wherein movement of said over-center actuation bar causes said wire to open and close said split compression ring.

12. The optical accessory of claim 10, wherein said split compression ring is partially separated from said housing by a stress reducing slot.

13. The optical accessory of claim 6, wherein said housing further comprises a removable external plate covering said second internal cavity.

14. The optical accessory of claim 13, wherein said removable external plate includes an aperture with a removable aperture cover, said removable aperture cover allowing direct access to said power source without removing said external plate.

15. The optical accessory of claim 3, wherein the image modification module comprises an image intensifying instrument.

16. The optical accessory of claim 10, wherein the image modification module comprises an image intensifying instrument.

17. the optical accessory of claim 11, wherein the image modification module comprises an image intensifying instrument.

18. An optical accessory adapted to be attached to an eyepiece of an optical device without modification of the optical device, the optical accessory comprising:

a housing having a first internal cavity disposed therein;

said housing having coupler integrally formed at a first end of said housing and adapted to be clampingly coupled to the eyepiece of the optical device;

a power supply mounted to said housing;

an objective lens mounted to said housing adjacent said first end of said housing and adapted to conduct therethrough an image received from the eyepiece of the optical device; and an image intensification module releasably engageable within said housing in a use position in which said module is operably coupled to said power supply and disposed in optically operative relationship with said objective lens to receive and intensify the image transmitted from the eyepiece of the optical device through said objective lens.

* * * * *